(12) United States Patent
Jauss et al.

(10) Patent No.: US 11,947,807 B2
(45) Date of Patent: Apr. 2, 2024

(54) METHOD AND DEVICE FOR PROCESSING DATA STORED IN A MEMORY UNIT

(71) Applicant: Robert Bosch GmbH, Stuttgart (DE)

(72) Inventors: Manuel Jauss, Wissgoldingen (DE); Mustafa Kartal, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 386 days.

(21) Appl. No.: 17/311,227

(22) PCT Filed: Jan. 30, 2020

(86) PCT No.: PCT/EP2020/052311
§ 371 (c)(1),
(2) Date: Jun. 4, 2021

(87) PCT Pub. No.: WO2020/164921
PCT Pub. Date: Aug. 20, 2020

(65) Prior Publication Data
US 2022/0028472 A1    Jan. 27, 2022

(30) Foreign Application Priority Data
Feb. 14, 2019   (DE) .......................... 102019201922.6

(51) Int. Cl.
*G06F 3/06*     (2006.01)
*G06F 21/60*    (2013.01)
(Continued)

(52) U.S. Cl.
CPC ............ *G06F 3/0619* (2013.01); *G06F 3/064* (2013.01); *G06F 3/0671* (2013.01);
(Continued)

(58) Field of Classification Search
CPC ......... G11C 29/10; G11C 29/36; G11C 29/46; G11C 2029/3602; G06F 21/602;
(Continued)

(56) References Cited

U.S. PATENT DOCUMENTS

| 6,553,530 B1 * | 4/2003 | Kim ................. G01R 31/31813 |
|---|---|---|
| | | 714/739 |
| 2013/0067245 A1 | 3/2013 | Horovitz et al. |
| 2018/0375696 A1 | 12/2018 | Sadiq et al. |

FOREIGN PATENT DOCUMENTS

| JP | H07320499 A | 12/1995 |
|---|---|---|
| JP | 2017169147 A | 9/2017 |
| WO | 2018024658 A1 | 2/2018 |

OTHER PUBLICATIONS

International Search Report for PCT/EP2020/052311, dated May 13, 2020.

(Continued)

*Primary Examiner* — Cynthia Britt
(74) *Attorney, Agent, or Firm* — NORTON ROSE FULBRIGHT US LLP; Gerard A. Messina

(57) ABSTRACT

A method for processing data stored in a memory unit. The method includes the following steps: ascertaining a randomly or pseudo-randomly formed test pattern, which characterizes at least one first subarea of a memory area of the memory unit, forming, as a function of the test pattern, a test variable associated with data stored in the at least one first subarea.

20 Claims, 17 Drawing Sheets

Table T1

| | Column S1 | Column S2 |
|---|---|---|
| Row Z1 | Start address SA1 | 111b=0x7 |
| Row Z2 | Start address SA2 | 001b=0x1 |
| Row Z3 | Start address SA3 | 000b=0x0 |
| Row Z4 | *** | *** |

(51) Int. Cl.
  *G06F 21/64* (2013.01)
  *G11C 29/10* (2006.01)
  *G11C 29/36* (2006.01)
  *G11C 29/46* (2006.01)

(52) U.S. Cl.
  CPC ............ *G06F 21/602* (2013.01); *G06F 21/64* (2013.01); *G11C 29/10* (2013.01); *G11C 29/36* (2013.01); *G11C 29/46* (2013.01); *G11C 2029/3602* (2013.01)

(58) Field of Classification Search
  CPC ........ G06F 21/64; G06F 3/064; G06F 3/0671; G06F 3/0619
  See application file for complete search history.

(56) References Cited

OTHER PUBLICATIONS

Fips Pub 180-4, "Secure Hash Standard (SHS)", Federal Information Processing Standards Publication, National Institute of Standards and Technology, 2015, pp. 1-36. <https://nvlpubs.nist.gov/nistpubs/FIPS/NIST.FIPS.180-4.pdf> Downloaded Jun. 4, 2021 <http://dx.doi.org/10.6028/NIST.FIPS. 180-4>.

* cited by examiner

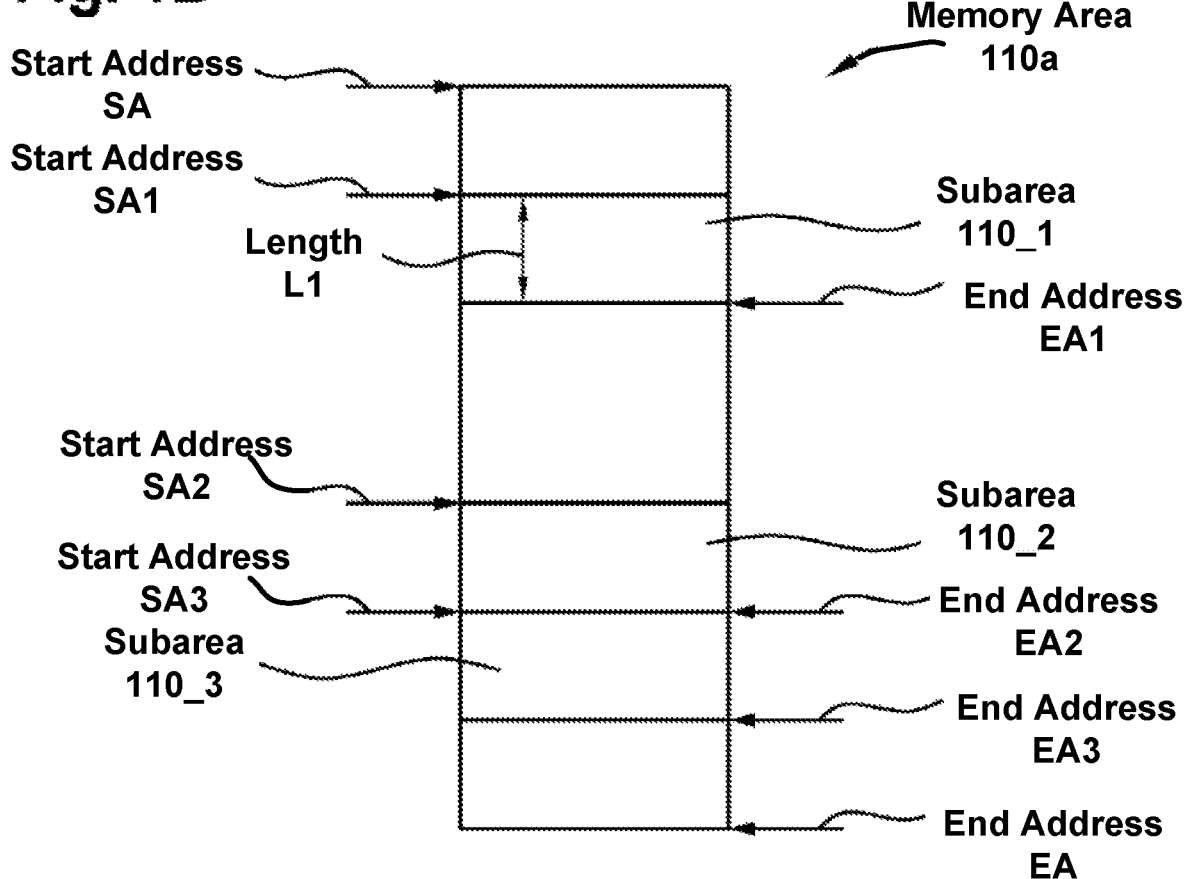

Table T2

|  | Column S1 | Column S2 | Column S3 |
|---|---|---|---|
| Row Z1 | ID1 | 0xD | 0x4 |
| Row Z2 | ID2 | 0x6 | 0x7 |
| Row Z3 | ID3 | ... | ... |
| Row Z4 | ... | ... | ... |

Table T3

|  | Column S1 | Column S2 | Column S3 |
|---|---|---|---|
| Row Z1 | ID1' | Length ZF1" | Offset ZF2" |
| Row Z2 | ID2' | Length ZF3" | Offset ZF4" |
| Row Z3 | ID3' | ... | ... |
| Row Z4 | ... | ... | ... |

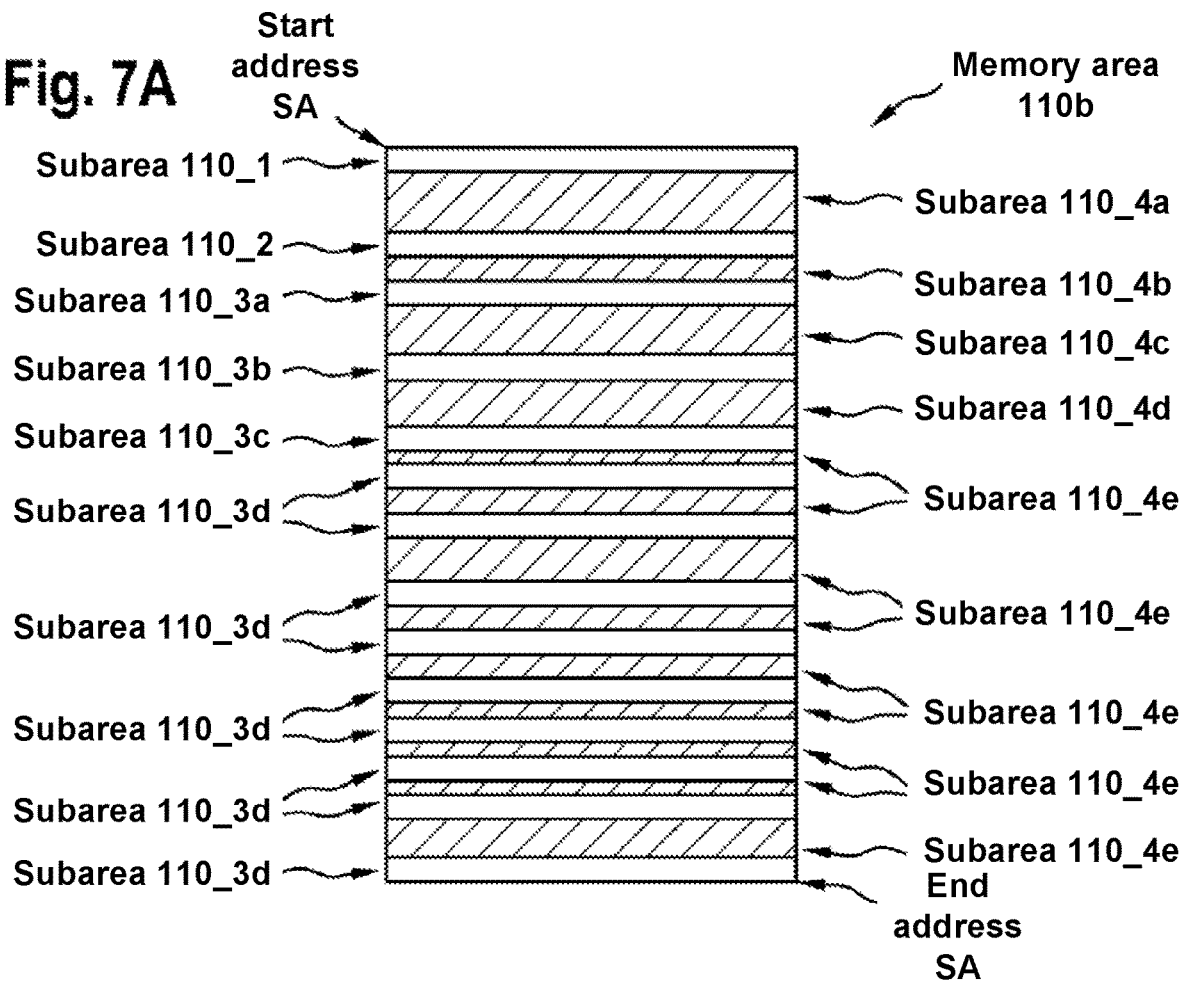

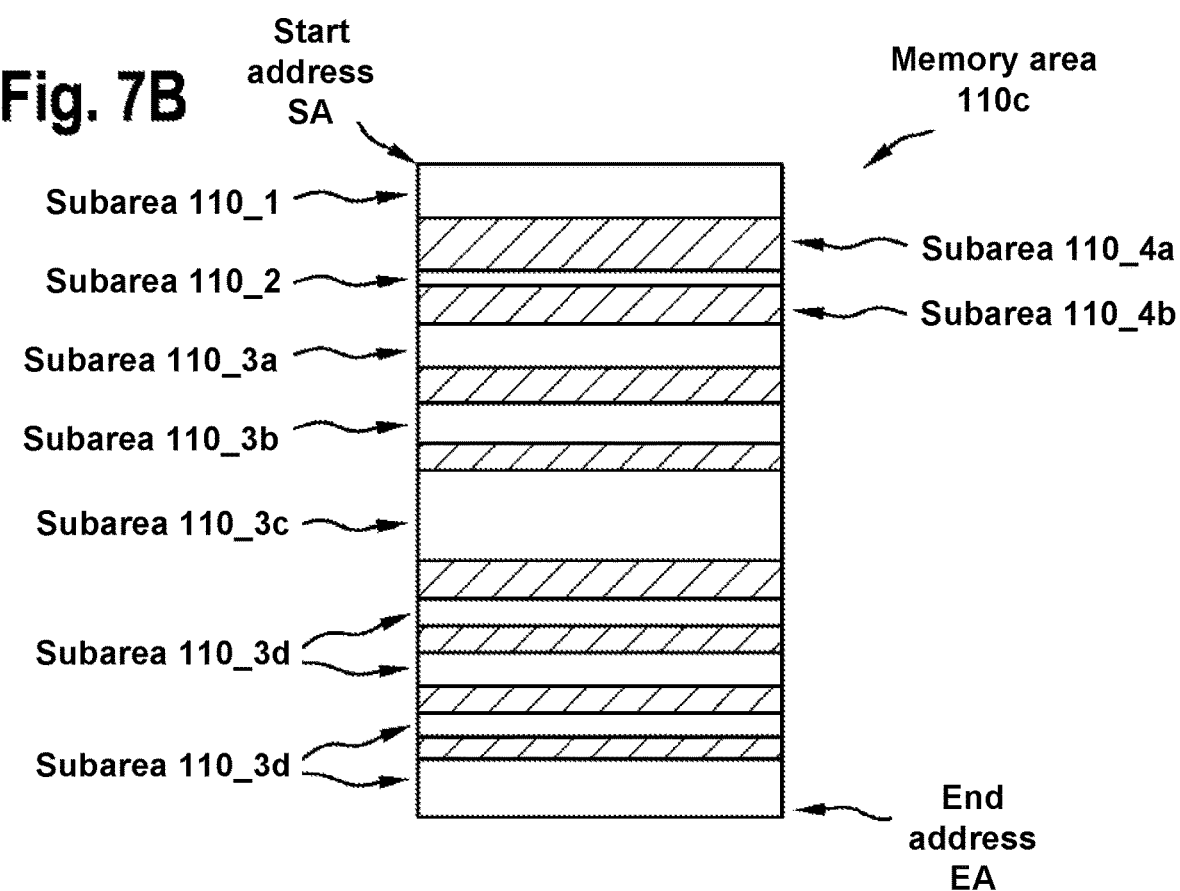

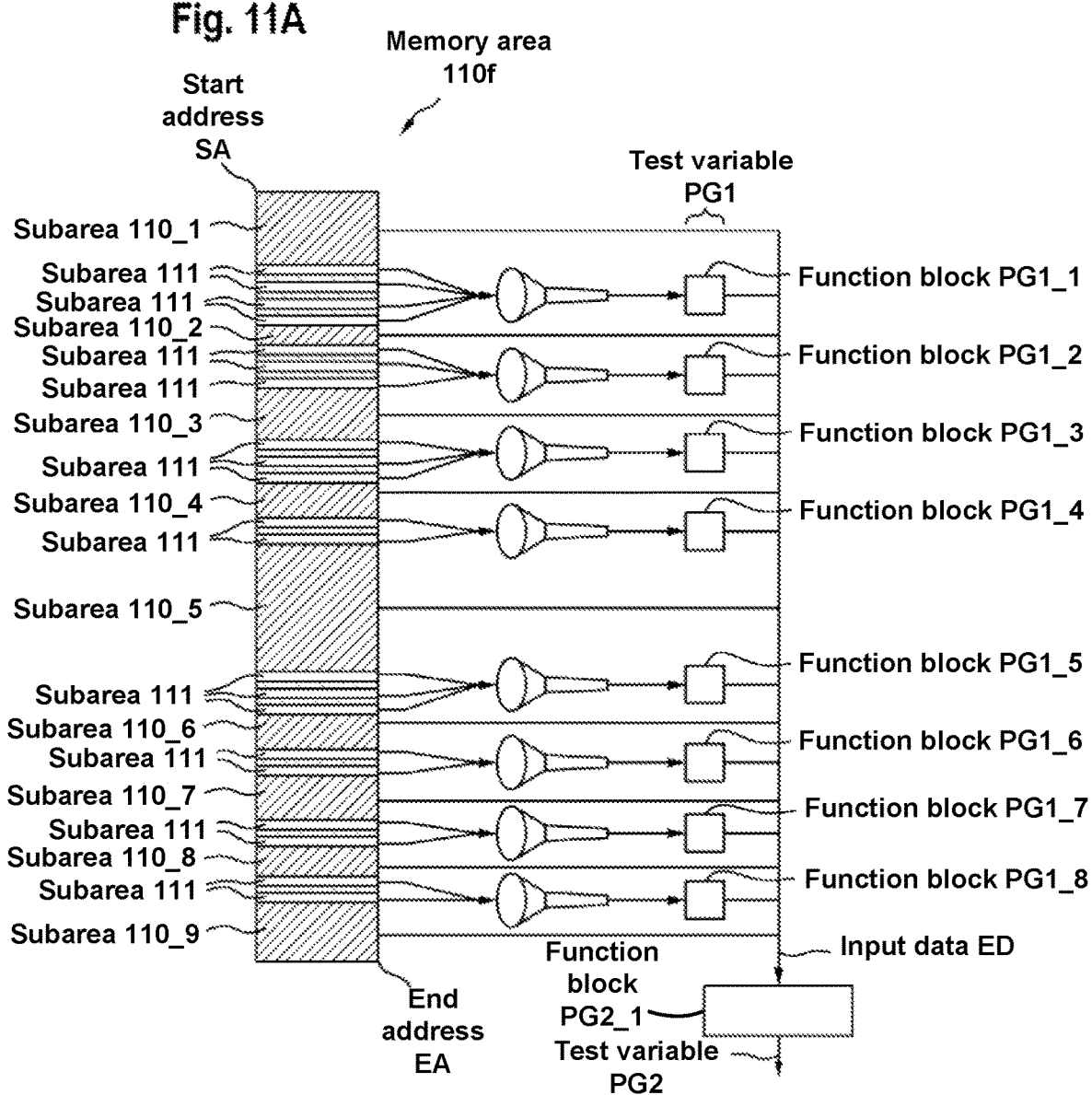

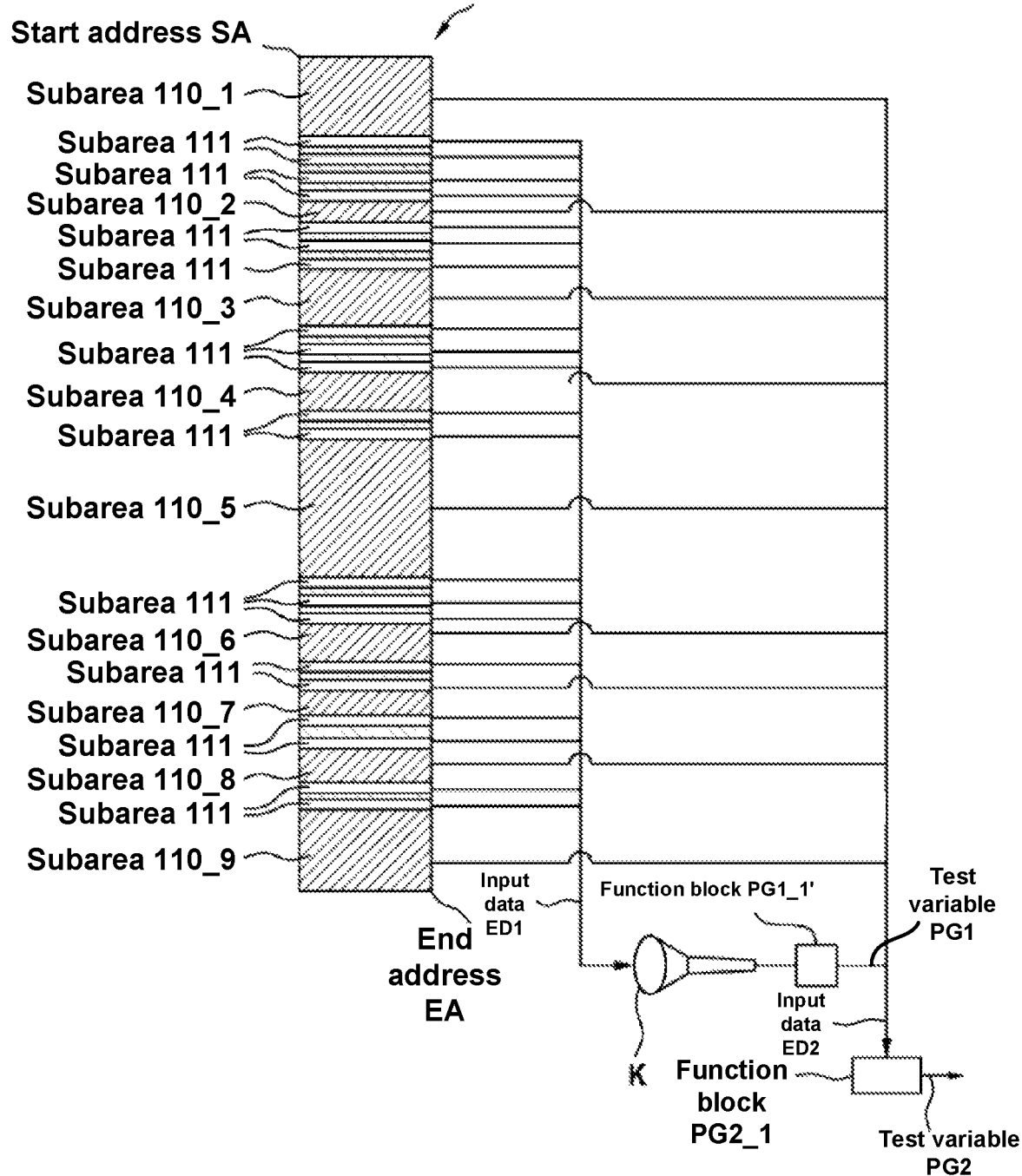

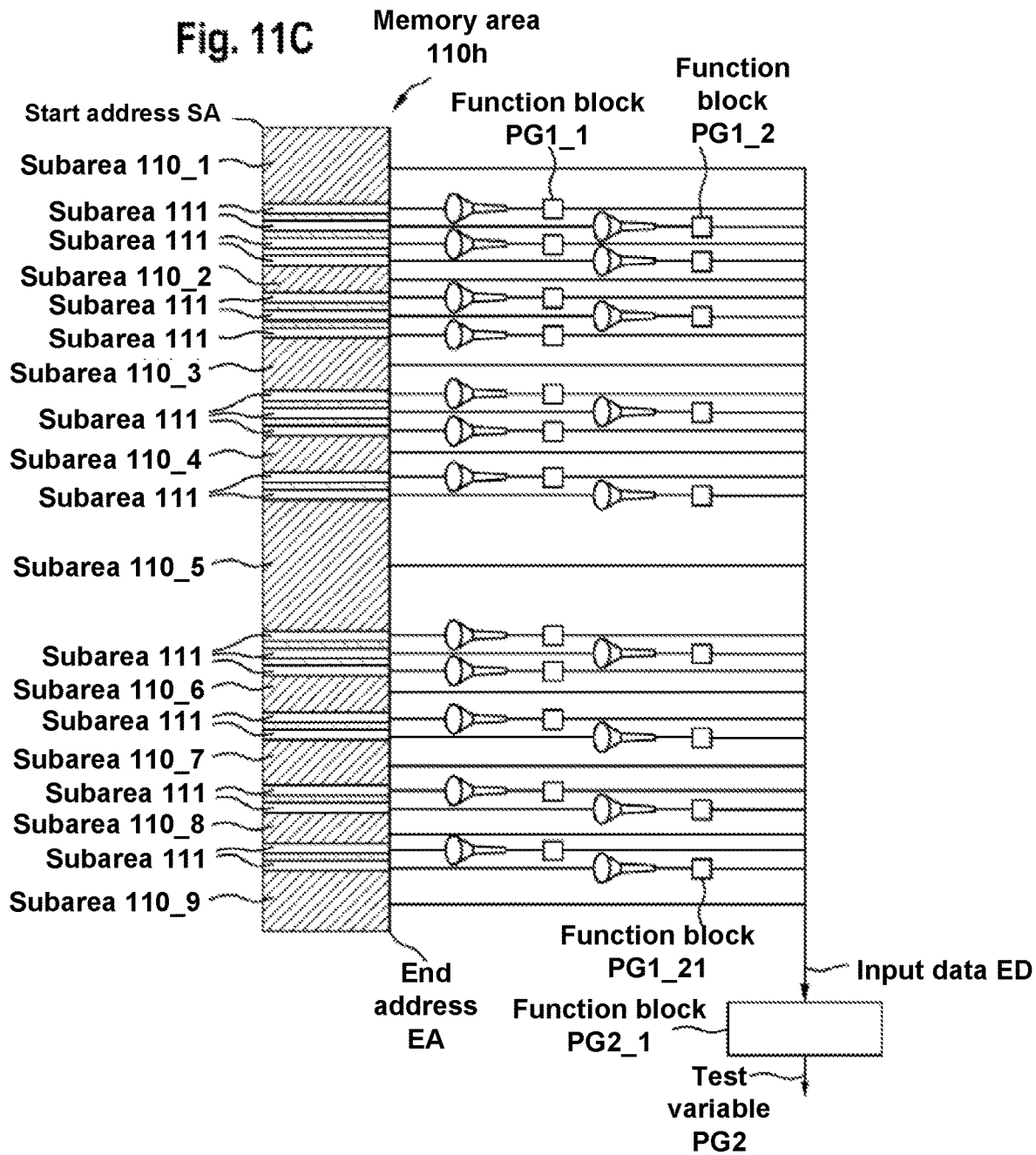

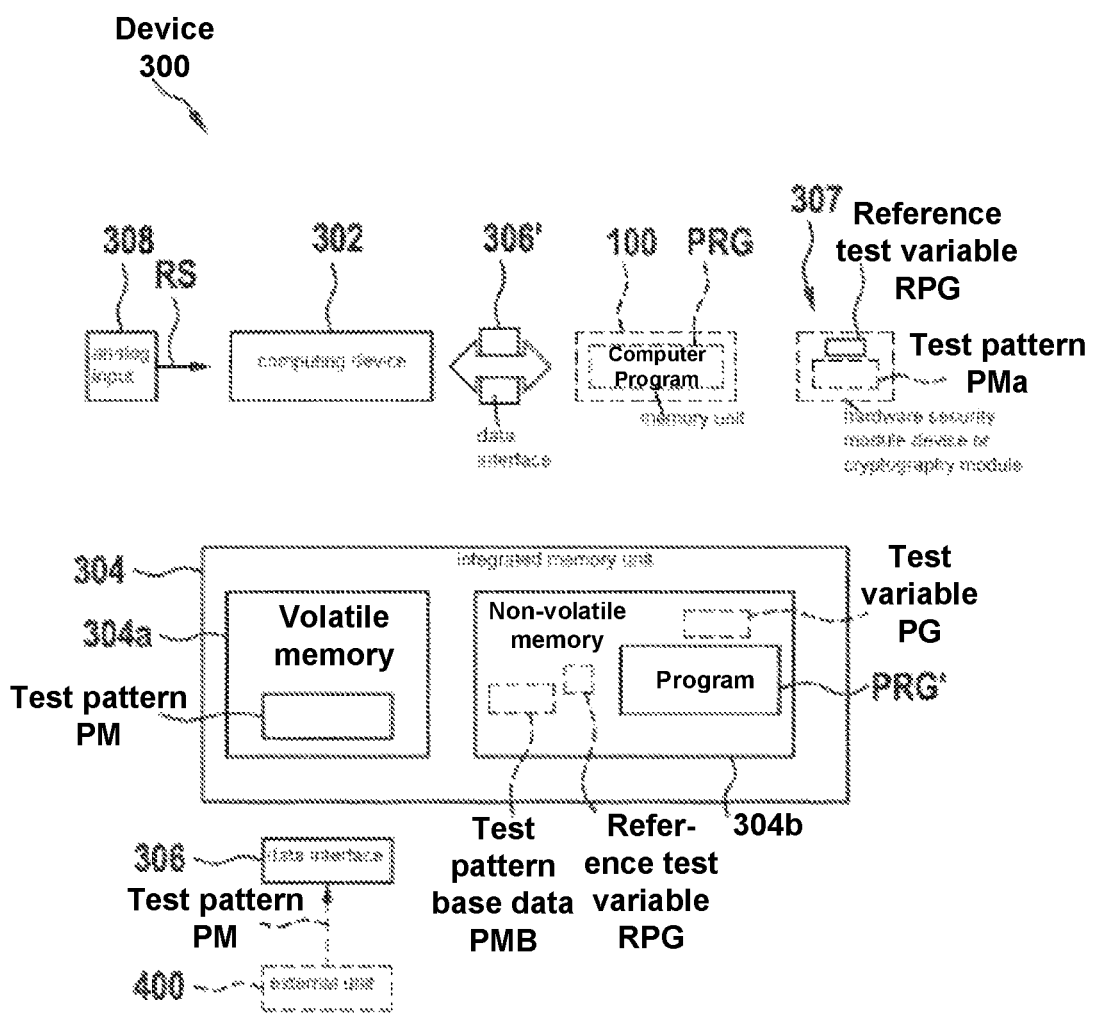

METHOD AND DEVICE FOR PROCESSING DATA STORED IN A MEMORY UNIT

FIELD

The present invention relates to a method for processing data stored in a memory unit.

The present invention further relates to a device for processing data stored in a memory unit.

SUMMARY

Preferred specific embodiments of the present invention relate to a method for processing data stored in a memory unit, including the following steps: ascertaining a randomly or pseudo-randomly formed test pattern, which characterizes at least one first subarea of a memory area of the memory unit, forming, as a function of the test pattern, a test variable associated with data stored in the at least one first subarea. In further preferred specific embodiments, the memory unit includes at least one semiconductor memory component and is, for example, a volatile memory (for example, a working memory, RAM, random access memory) or a non-volatile memory, for example, a flash memory (for example, NOR flash or NAND flash). With the aid of the randomly or pseudo-randomly formed test pattern, it is possible to unpredictably and individually select or predefine, for example, for a particular memory unit, a memory area on which the formation of the test variable is to be based. The test variable in this case advantageously characterizes a data content of the first subarea and allows, for example, by comparison with a reference test variable, for the identification of changes, in particular, manipulations of the data of the first subarea.

In further preferred specific embodiments of the present invention, a device may be provided for carrying out the method according to the specific embodiments. In further particularly preferred specific embodiments, the device includes at least one computing device, to which, for example, the above described memory unit may be assigned, in particular, for at least temporarily storing at least one computer program and/or data, in particular, data to be processed with the aid of the device. A computer program may be further preferably stored in the memory unit for controlling an operation of the device, in particular, for carrying out the method according to the specific embodiments.

In further preferred specific embodiments of the present invention, the computing device includes at least one of the following elements: a microprocessor, a microcontroller, a digital signal processor (DSP), a programmable logic module (for example, FPGA, field programmable gate array), an ASIC (application-specific integrated circuit). Combinations thereof are also possible in further preferred specific embodiments.

In further preferred specific embodiments of the present invention, at least one further memory unit, in addition to the memory unit described above, may also be assigned to the device, which includes at least one of the following elements: a volatile memory, in particular, a working memory (RAM), a non-volatile memory, in particular, a flash memory, for example, flash EEPROM or NOR flash or NAND flash. When providing the optional at least one further memory unit, a computer program designed to control an operation of the device, in particular, for carrying out the method according to the specific embodiments, may alternatively or additionally also be stored in the at least one further memory unit.

In further preferred specific embodiments of the present invention, the first subarea does not correspond to the entire memory area, but, for example, only to a fraction of the entire memory area. In other words, it is accordingly provided in further preferred specific embodiments that the test pattern does not completely cover the memory area. In further preferred specific embodiments, the test pattern covers, for example, 50% (percent) of the memory area of the memory unit or less, in particular, 20% or less. More or less coverage than, for example, 50%, is also possible in further preferred specific embodiments.

In further preferred specific embodiments of the present invention, the first subarea of the memory area may, for example, correspond to at least one address area (or to a portion thereof) of the memory unit. In further preferred specific embodiments, the first subarea characterizes a cohesive address area of the memory unit, the first subarea being describable by a) a start address and an end address and/or b) a start address and a length of the first subarea and/or c) the end address and the length of the first subarea.

In further preferred specific embodiments of the present invention, the first subarea characterizes a non-cohesive address area of the memory unit, correspondingly multiple start addresses and/or end addresses and/or pieces of length information being usable in order to describe the first subarea. Alternatively or in addition to the aforementioned pieces of information (start address, end address, length), an address mask, in particular, a bit mask or byte mask may also be used in further preferred specific embodiments in order to define the first subarea. In further preferred specific embodiments, at least one of the aforementioned pieces of information (start address, end address, length, bit mask or byte mask), for example, may be randomly or pseudo-randomly selected within the scope of the random or pseudo-random formation of the test pattern. In further preferred specific embodiments, preferably multiple, in particular, all pieces of information required for describing the first subarea (start address, end address, length, bit mask or byte mask) are randomly or pseudo-randomly selected or formed.

In further preferred specific embodiments of the present invention, it is provided that the method further includes: at least temporarily storing the test variable. In this way, the test variable may be used later, for example, as a reference test variable for ascertaining whether data of the first subarea have been manipulated (i.e., intentionally altered) and/or unintentionally changed.

In further preferred specific embodiments of the present invention, it is provided that the method further includes: comparing the test variable with a reference test variable for the at least first subarea. For example, the test variable may have been ascertained during a manufacture of the memory unit and/or during programming of the memory unit and/or on another occasion, in particular, applying the method according to the specific embodiments and, if necessary, may have been stored at least temporarily, preferably in a secure memory, for a later use, so that it is available for comparison. In the case of a deviation of the (instantaneously formed) test variable from the corresponding reference test variable, an (unintentional) change or manipulation of the data, for example, of the associated subarea or of the associated subareas for which the reference test variable has been formed may be deduced. If the instantaneously formed test variable matches the corresponding reference test variable, it may be deduced that no (unintentional) change or manipulation of relevant data is present.

In further preferred specific embodiments of the present invention, it is provided that the ascertainment of the test pattern includes at least one of the following elements: a) random or pseudo-random formation of the test pattern, b) receiving the test pattern from an external unit, c) reading out the test pattern from the memory unit and/or from a further (i.e., other) memory unit, d) deriving the test pattern from test pattern base data.

In further preferred specific embodiments of the present invention, a pseudo-random or random generator, for example, may be used for the forming of the test pattern, which is assigned to a device for carrying out the method according to the specific embodiments, for example, including, or designed as, a microcontroller. In further preferred specific embodiments, a noise signal of the device, for example, may be used as a random variable for the random formation of the test pattern, which noise signal is ascertainable, for example, at an analog input of the device (for example, the microcontroller).

In further preferred specific embodiments of the present invention, the randomly or pseudo-randomly formed test pattern may also be received from an external unit, for example, from a computing device of a production unit for a device provided for carrying out the method according to the specific embodiments. In this case, the transfer of the test pattern to the device takes place in further preferred specific embodiments via a secured communication channel.

In further preferred specific embodiments of the present invention, the test pattern or at least one test pattern, in further specific embodiments possibly also multiple test patterns, may be stored in the memory unit and/or in the at least one further (optional) memory unit, so that the device designed for carrying out the method according to the specific embodiments may, if needed, read in the relevant test pattern from the corresponding memory unit.

In further preferred specific embodiments of the present invention instead of a complete test pattern, randomly or pseudo-randomly formed test pattern base data, for example, which do not already represent a complete test pattern, may also be provided and transmitted to the device according to the specific embodiments and/or may be stored in at least one of the memory units. In further preferred specific embodiments, at least one test pattern may be formed by the device according to the specific embodiments, in particular, also dynamically (during the runtime of the device), as a function of these test pattern base data.

In further preferred specific embodiments of the present invention, at least one test pattern is or the test pattern base data are, stored in a secure memory unit or in a secure memory area of the memory unit, to which, for example, only one device provided for carrying out the method according to the specific embodiments has access, but not further (in particular, external) units. This may, for example, be implemented in that a further memory unit, preferably integrated into the device, which may be readout only by the device, is assigned to the device according to the specific embodiments, and which includes, for example no data interfaces to external units. In further preferred specific embodiments, the further memory unit may, for example, also be integrated into a hardware security module, which is also designed, for example, for carrying out cryptographic methods or algorithms or at least parts thereof, which are useful in further preferred specific embodiments, for example, for forming the test variable.

In further preferred specific embodiments of the present invention, it is provided that the forming of the test patterns encompasses the following steps: providing a random or pseudo-random, preferably binary sequence of numbers, ascertaining the at least one first subarea as a function of at least a first part of the sequence of numbers, in particular, a start address of the first subarea being formed in the memory area as a function of the first part of the sequence of numbers. In further preferred specific embodiments, an end address of the first subarea and/or a length of the first subarea may alternatively or additionally also be formed as a function of the sequence of numbers, in particular, as a function of parts of the sequence of numbers other than of the aforementioned first part.

In further preferred specific embodiments of the present invention, a start address of the first subarea may be ascertained, for example, as a function of the first part of the sequence of numbers and a length of the first subarea may be ascertained as a function of a second part of the sequence of numbers, which is different from the first part of the sequence of numbers. If further subareas in further preferred specific embodiments, see below, are provided in order to form the test pattern, the further subareas may be ascertained preferably in a comparable manner.

In further preferred specific embodiments of the present invention, the start address may be ascertained as a function of the first part of the sequence of numbers and the end address, for example, of the first subarea, may be ascertained as a function of the second part of the sequence of numbers.

In further preferred specific embodiments of the present invention, the ascertainment of the start address and/or of the end address and/or of the length as a function of a relevant part of the sequence of numbers may also encompass a multiplication of a numerical value represented by the relevant part of the sequence of numbers by a respective predefinable factor (which in preferred specific embodiments may also be variously selected for the different parts of the sequence of numbers). The use of a corresponding factor makes it advantageously possible to ascertain comparatively large memory areas or memory addresses from comparatively short parts of the sequence of numbers. In further preferred specific embodiments, the respective factor may be (pseudo-)randomly ascertained or constantly or variably selected (for example, as a function of at least one operating parameter of a device according to the specific embodiments). In further specific embodiments, an adaptation of previously used values (start address and/or end address and/or length, etc.) may also be provided alternatively or in addition to the above-mentioned use of the factor.

In further preferred specific embodiments of the present invention, the start address of the, for example, first subarea, may for example, also be interpreted as an address distance (offset) of the first subarea of a start address of the memory area of the memory unit.

In further preferred specific embodiments of the present invention, it is provided that in addition to the first subarea, the test pattern characterizes at least one second subarea, preferably multiple further subareas, the second subarea, in particular, the at least one further subarea, not directly bordering on the first subarea. This means that the start address of the second or further subarea in the address space of the memory unit does not directly follow the end address of the first subarea or of another further subarea, which results in a distribution of the subareas contributing to the formation of the test variable over the memory area of the memory unit. In this way, comparatively large areas of the memory unit may be advantageously checked in the course of the formation and evaluation of the test variable, without a data volume corresponding to the entire memory area of the memory unit having to be considered for this purpose. Instead, it is sufficient to take into consideration the memory areas characterized by the at least one first subarea or, if necessary, by further optional subareas. This consideration is based on the fact that a targeted manipulation of such a memory area, which is not covered by the subarea or subareas according to the specific embodiments in terms of the formation of the test variable, is, due to the random or pseudo-random formation of the test pattern, extraordinarily difficult or impossible without knowledge of the latter. Thus, it is sufficient in further preferred specific embodiments if the at least one first subarea or the optional further subareas do not cover the entire memory area of the memory unit. Furthermore, the check of the memory area is accelerated as a result as compared to such variants, which take into consideration the entire data of the entire memory area for forming a test variable, because in the particularly preferred specific embodiments fewer data than the entire data of the entire memory are processed for the formation of the test variable.

In further preferred specific embodiments of the present invention, it is provided that the method further includes at least one of the following elements: a) ascertaining the second subarea as a function of a second part of the sequence of numbers, which is different from the first part of the sequence of numbers, in particular, a start address of the second subarea being formed in the memory area as a function of the second part of the sequence of numbers, b) ascertaining the further subareas as a function of a respective corresponding further part of the sequence of numbers which is, in particular, different in each case from the first part of the sequence of numbers and/or from the second part of the sequence of numbers, in particular, a start address of the respective further subarea being formed in the memory area as a function of the corresponding further part of the sequence of numbers. In further preferred specific embodiments, the aspects described above with reference to the ascertainment of the first subarea may also be applied in a corresponding manner to the second subarea and/or to at least one further subarea.

In further preferred specific embodiments of the present invention, it is provided that all subareas have the same length. In further preferred specific embodiments of the present invention, the start address or the end address of the relevant subarea may in this case, for example, be pseudo-randomly or randomly ascertained.

In further preferred specific embodiments of the present invention, it is provided that at least some of the subareas have a different length. In further preferred specific embodiments in the case, for example, the length (and if necessary the start address and/or the end address) of the relevant subarea may be pseudo-randomly or randomly ascertained.

In further preferred specific embodiments of the present invention, it is provided that the formation of the test variable includes at least one of the following elements: a) applying a hash function, in particular, a cryptologic hash function, in particular, to data stored in the at least one subarea, b) forming a check sum as a function of the data stored in the at least one first subarea, c) forming a signature, in particular, as a function of a first secret (in particular, asymmetrical, private) key and of the data stored in the at least one first subarea (in further preferred specific embodiments, the signature may also be formed via a hash value (see Element a) further above), d) forming a message authentication code (MAC), in particular, as a function of a second secret (in particular, symmetrical) key and of the data stored in the at least one first subarea.

In further preferred specific embodiments of the present invention, it is provided that the formation of the test variable includes the following steps: forming a primary test variable as a function of the data stored in the at least one first subarea, preferably as a function of data stored in multiple subareas, forming a secondary test variable at least as a function of the primary test variable.

In further preferred specific embodiments of the present invention, the formation of the primary test variable encompasses, for example, the formation of a check sum, in particular, of a CRC check sum and/or the evaluation of a hash function, for example, of an MD5 (Message Digest 5) hash function.

In further preferred specific embodiments of the present invention, it is provided that the formation of the test variable includes the following steps: selecting a first number of subareas of the memory area of the memory unit, selecting a second number of subareas of the memory area of the memory unit, which are different, in particular, from the first number, forming a or the primary test variable for the first number of subareas of the memory area, forming a or the secondary test variable for the second number of subareas of the memory area, the formation of the secondary test variable optionally additionally being carried out for at least one part of the primary test variable. In this way, different test variables may be advantageously formed (for example, with the aid of different methods) for the various subareas, as a result of which, for example, a computing time and/or a manipulation safety is controllable in a flexible, particularly also dynamic manner. In further preferred specific embodiments, for example, it may be provided to associate the first number of subareas with a test variable ascertainable with comparatively little computing time, and to associate the second number of subareas with a second test variable, which requires more computing time. With the aid of the selection of the first number and of the second number or the ratio of the first number to the second number, it is advantageously possible to control the computing time and/or the manipulation safety.

Further preferred specific embodiments of the present invention relate to a use of the method according to the specific embodiments before and/or after and/or during at least one of the following operating phases of a computing device, which is designed to access the memory unit: a) starting the computing device from a switched-off state, b) starting the computing device from an energy-saving state, in particular, a suspend-to-RAM state, c) starting the computing device from a reset state, in particular, from a soft-reset, d) normal operation.

In this way, a memory content of the memory unit may, for example, be advantageously checked for proper content before or during the start from a switched-off state ("booting") or a power-up or waking from a suspend-to-RAM state or also during normal operation, which may also be referred to as "runtime manipulation detection".

Further preferred specific embodiments of the present invention relate to a device for processing data stored in a memory unit, the device being designed to carry out the following steps: ascertaining a randomly or pseudo-randomly formed test pattern, which characterizes at least one subarea of a memory area of the memory unit, forming, as a function of the test pattern, a test variable associated with data stored in the at least one first subarea.

In further preferred specific embodiments of the present invention, it is provided that the device for carrying out the method is designed according to the specific embodiments.

Further preferred specific embodiments of the present invention relate to a method for forming a test pattern, which characterizes at least one first subarea of a memory area of a or of the memory unit for storing data, the test pattern being randomly or pseudo-randomly formed. In further preferred specific embodiments, it is provided that the method for forming the test pattern is carried out by the above described device according to the specific embodiments. In further preferred specific embodiments, the method for forming the test pattern may, however, (also) be carried out by other units, which then provide the formed test pattern, for example, to the device according to the specific embodiments, preferably via a secure channel, for example, in a protected production environment, in which the device according to the specific embodiments is manufactured.

Further features, possible applications and advantages of the present invention result from the following description of exemplary embodiments of the present invention, which are represented in the figures. All features described or represented in this case, alone or in arbitrary combination, form the subject matter of the present invention, regardless of their wording or representation in the description or in the figures.

BRIEF DESCRIPTION OF THE DRAWINGS

FIG. 1B schematically shows a simplified block diagram of a memory unit according to further preferred specific embodiments of the present invention.

FIG. 7A schematically shows a simplified block diagram of a memory unit according to further preferred specific embodiments of the present invention.

FIG. 7B schematically shows a simplified block diagram of a memory unit according to further preferred specific embodiments of the present invention.

FIGS. 11A, 11B, 11C each schematically show a simplified flowchart of a method according to further preferred specific embodiments of the present invention.

FIG. 12 schematically shows a simplified block diagram of a device according to further preferred specific embodiments of the present invention.

DETAILED DESCRIPTION OF EXAMPLE EMBODIMENTS

Figure 1A:
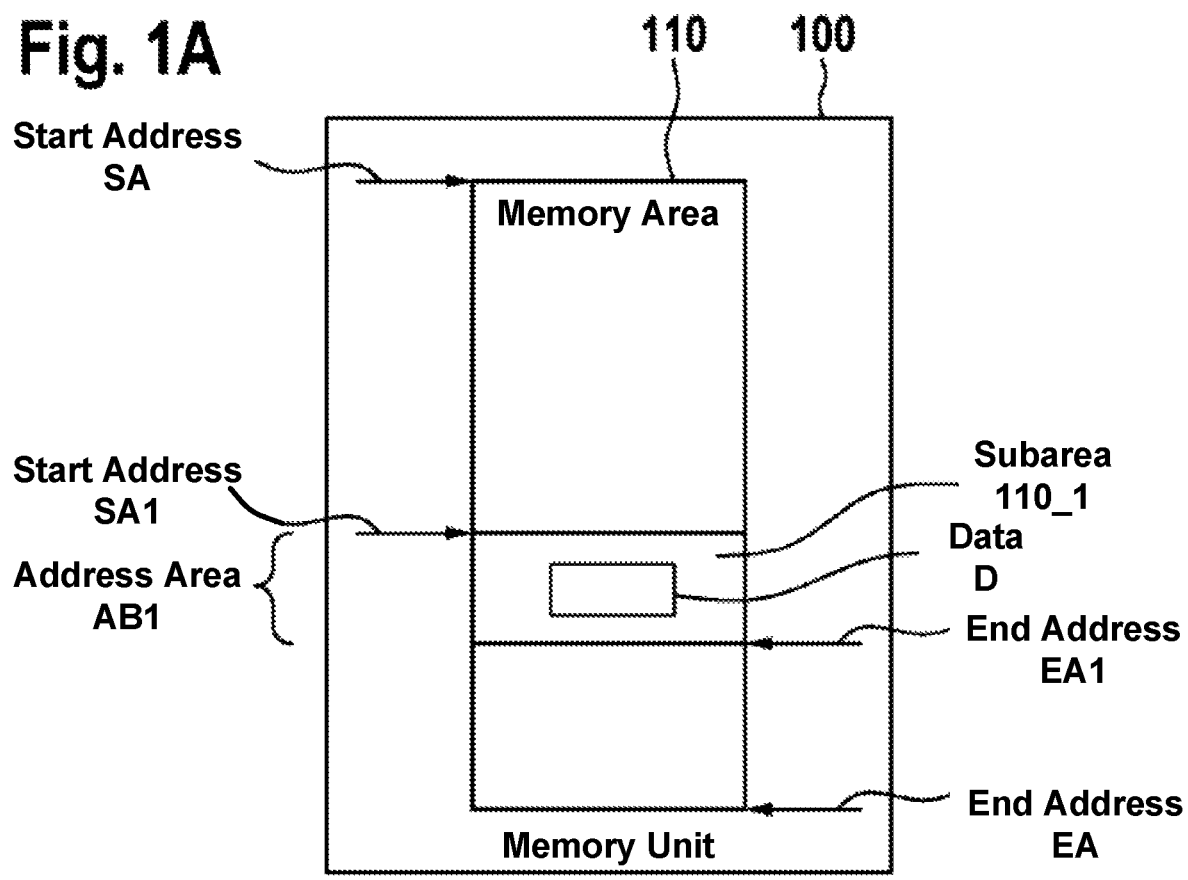
FIG. 1A schematically shows a simplified block diagram of a memory unit according to preferred specific embodiments of the present invention.

FIG. 1A schematically shows a simplified block diagram of a memory unit 100 according to preferred specific embodiments. Memory unit 100 includes, for example, at least one semiconductor memory component and is, for example, a volatile memory (for example, a working memory, RAM random access memory) or a non-volatile memory, for example, a flash memory. A memory area 110 is defined between a start address SA and an end address EA.

Figure 2A:
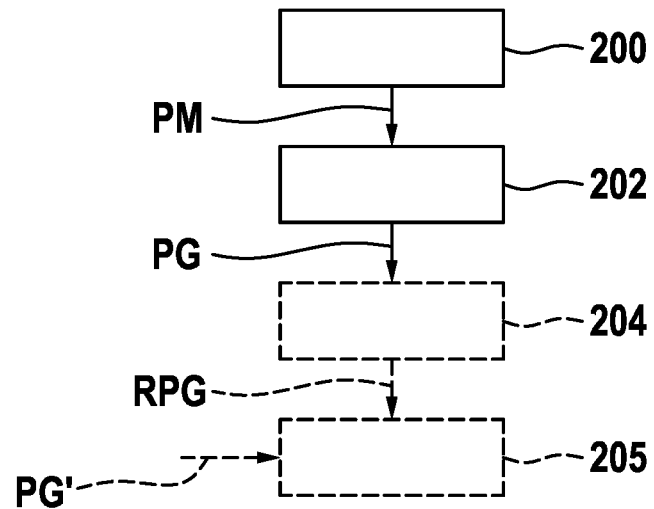
FIG. 2A schematically shows a simplified flowchart of a method according to further preferred specific embodiments of the present invention.

Further preferred specific embodiments relate to a method for processing data D stored in memory unit 100, including the following steps, cf. also the simplified flowchart from FIG. 2A: ascertaining 200 a randomly or pseudo-randomly formed test pattern PM, which characterizes at least one first subarea 110_1 (FIG. 1A) of a or of the memory area 110 of memory unit 100, forming 202 (FIG. 2A), as a function of test pattern PM, a test variable PG associated with data D stored in the at least one first subarea 110_1. With the aid of the randomly or pseudo-randomly formed test pattern PM, it is possible to select unpredictably and individually, for example, for a particular memory unit 100 a memory area (or the data stored therein) on which the formation of test variable PG is to be based. In this case, test variable PG advantageously characterizes a data content of first subarea 110_1 and makes it possible, for example, by comparison with a reference test variable, to identify changes, in particular, manipulations of the data of the first subarea.

In further preferred specific embodiments, the test variable, the ascertainment of which is discussed in greater detail further below, may represent a (single) numerical value, for example, in the case of an ascertainment of the test variable with the aid of a check sum method (for example, CRC cyclic redundancy check), the value of the (CRC) check sum or in the case of an ascertainment of the test variable with the aid of a hash value method, the hash value. In further preferred specific embodiments, the test variable may, however, also represent a n-tuple, n=2, 3, 4, . . . of correspondingly numerous individual values or another form of values, for example, a vector and/or a matrix or the like.

In further preferred specific embodiments, a device 300 is provided for carrying out the method according to the specific embodiments, cf. the simplified block diagram of FIG. 12.

Device 300 includes preferably at least one computing device 302 to which, for example, above described memory unit 100 may be assigned, in particular, for at least temporarily storing at least one computer program PRG and/or data D (FIG. 1A), in particular, data to be processed with the aid of device 300. A computer program PRG for controlling an operation of device 300, in particular, for carrying out the method according to the specific embodiments, may further preferably be stored in memory unit 100. In further preferred specific embodiments, multiple computer programs (not shown in FIG. 12) are stored in memory unit 100, for example, a bootloader, which is able to control a start process of the device or the call up of further computer programs, as well as the further computer programs, which involve, for example, an operating system and/or application programs.

In further preferred specific embodiments, computing device 302 includes at least one of the following elements: a microprocessor, a microcontroller, a digital signal processor (DSP), a programmable logic module (for example, FPGA, field programmable gate array), an ASIC (application-specific integrated circuit), a hardware circuit. Combinations thereof are also possible in further preferred specific embodiments.

In further preferred specific embodiments, at least one further memory unit 304, which includes at least one of the following elements: a volatile memory 304*a*, in particular, a working memory (RAM), a non-volatile memory 304*b*, in particular, flash memory, for example, flash EEPROM, may, in addition to memory unit 100 described above, also be assigned to device 300 (FIG. 12). When providing the optional at least one further memory unit 304, a computer program PRG' designed to control an operation of device 300, in particular, to carry out the method according to the specific embodiments, may alternatively or additionally also be stored in the at least one further memory unit 304. One or multiple test patterns PM and/or test variables PG, in particular, also reference test variables are also, for example, at least temporarily storable in memory unit 304.

In further preferred specific embodiments, cf. FIG. 1A, first subarea 110_1 does not correspond to entire memory area 110, but, for example, to only a fraction of entire memory area 110. In other words, it is accordingly provided in further preferred specific embodiments that test pattern PM (FIG. 2A) does not completely cover memory area 110. In further preferred specific embodiments, the test pattern covers, for example, 50% of memory area 110 of memory unit 100 or less (or more), in particular, 20% or less.

In further preferred specific embodiments, first subarea 110_1 of memory area 110 may, for example, correspond to at least one address area AB1 (in particular, not to the entire theoretically possible or physically existing address area) of memory unit 100, the at least one address area being situated, for example, between start address SA1 and end address EA1. In further preferred specific embodiments, first subarea 110_1 therefore characterizes a cohesive address area AB1 of memory unit 100, first subarea 110_1 being describable, for example, by a) above-mentioned start address SA1 and end address EA1 and/or b) by a start address SA1 and a length (not shown) of first subarea 110_1 and/or c) end address EA1 and the length of first subarea 110_1.

In further preferred specific embodiments (not shown), first subarea 110_1 characterizes a non-cohesive address area of memory unit 100, correspondingly multiple start addresses and/or end addresses and/or pieces of length information being usable in order to described the first subarea.

Alternatively or in addition to the aforementioned pieces of information (start address, end address, length), an address mask, in particular, bit mask or byte mask or work mask or block mask (including blocks of in each case, for example, k many bytes, k=2, 3, 4, . . . ) may be used in further preferred specific embodiments in order to define first subarea 110_1. In further preferred specific embodiments, at least one of the aforementioned pieces of information (start address, end address, length, bit mask or byte mask or work mask or block mask), for example, may be randomly or pseudo-randomly selected within the scope of the random or pseudo-random formation of test pattern PM. In further preferred specific embodiments, preferably multiple, in particular, all pieces of information (start address, end address, length, bit mask or byte mask, or word mask or block mask) required for describing the first subarea may be selected or formed in a random or pseudo-random manner.

For example, both start address SA1 as well as end address EA1 for subarea 110_1 may (pseudo-)randomly ascertained in order to form the test pattern.

In further preferred specific embodiments, cf. FIG. 2A, it is provided that the method further includes, at least temporarily storing 204 test variable PG. In this way, test variable PG may be used later, for example, as a reference test variable RPG (FIG. 12), for example, useful for ascertaining whether in the meantime (since the formation of the test variable) data of first subarea 110_1 have been manipulated (i.e., intentionally altered) and/or unintentionally changed.

In further preferred specific embodiments, it is provided that the method further includes: comparing 205 an instantaneously formed test variable PG' (FIG. 2A) with a reference test variable RPG (obtained, for example, by preceding steps 202, 204) for the at least one first subarea 110_1. For example, reference test variable RPG may have been ascertained during a manufacture of memory unit 100 and/or during a programing of memory unit 100 and/or on another occasion, in particular, while applying the method according to the specific embodiments (for example, steps 200, 202) and, if necessary, may have been stored (cf. step 204) for a later use at least temporarily preferably in a secure memory, so that it is available for comparison 205. In the case of a deviation of (instantaneously formed) test variable PG' from corresponding reference test variable RPG, an (unintentional) change or manipulation of the data of associated subarea 110_1 or of the associated subareas for which reference test variable RPG has been formed may be deduced. If the instantaneously formed test variable PG' matches corresponding reference test variable RPG, it may then be deduced that no (unintentional) change or manipulation of relevant data is present.

In further preferred specific embodiments, it is provided that test pattern PM is ascertained during a manufacture of memory unit 100 and/or during a programming of memory unit 100 and/or on another occasion, in particular, while applying the method according to the specific embodiments (for example, step 200), and, if necessary, is stored for a later use at least temporarily, preferably in a secure memory, so that it is available in the future.

Figure 2B:
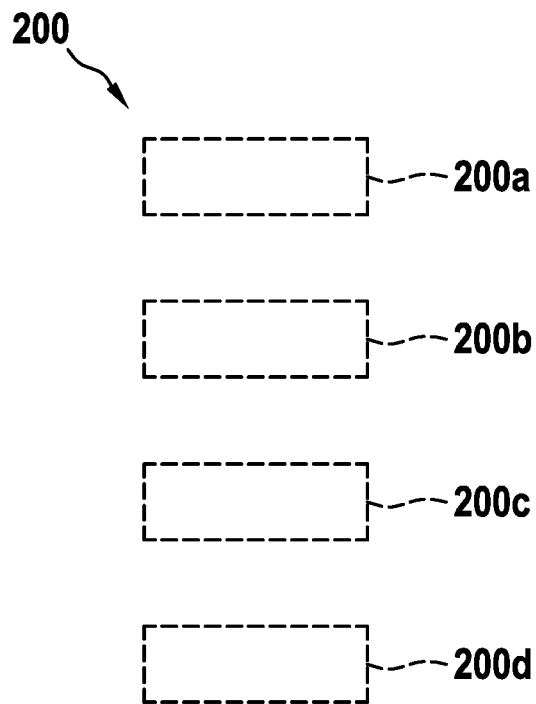
FIG. 2B schematically shows a simplified flowchart of a method according to further preferred specific embodiments of the present invention.

In further preferred specific embodiments, it is provided that ascertainment 200 (FIG. 2A) of test pattern PM includes at least one of the following elements, cf. FIG. 2B: a) randomly or pseudo-randomly forming 200a the test pattern, b) receiving 200b test pattern PM from an external unit 400 (FIG. 12), for example, with the aid of a data interface 306, in particular, with the aid of a secured communication channel and/or in a secured (production) environment, c) reading out 200c the test pattern from memory unit 100 and/or from a further (i.e., other) memory unit 304, d) deriving 200d the test pattern from test pattern base data.

In further preferred specific embodiments, a pseudo-random generator or a random generator, for example, which is assigned to device 300 (FIG. 12), for example, including a, or designed as, a microcontroller, may be used for forming the test pattern. In further preferred specific embodiments, a noise signal RS of device 300, for example, may be used as a random variable for the random formation of the test pattern, which noise signal RS is ascertainable, for example, at an analog input 308 of device 300.

In further preferred specific embodiments, randomly or pseudo-randomly formed test pattern PM may optionally also be received from an external unit 400, cf. FIG. 12, for example, from a processing device of a manufacturing unit for device 300. In this case, the transmission of test pattern PM to device 300 takes place in further preferred specific embodiments via a secured communication channel and data interface 306. A test pattern PM received in this way is also storable, for example, in further memory unit 304. In further preferred specific embodiments, test pattern PM may be ascertained or formed with the aid of external unit 400 using a (pseudo-) random generator (for example, as a function of a noise signal).

In further preferred specific embodiments, test pattern PM or at least one test pattern, in still further specific embodiments optionally also multiple test patterns, may be stored in memory unit 100 and/or in the at least one further (optional) memory unit 304, as mentioned above, so that device 300 designed to carry out the method according to the specific embodiments may, if needed, read in relevant test pattern PM from corresponding memory unit 100, 304.

In further preferred specific embodiments, further memory unit 304 is a memory unit integrated into device 300, which the, in particular, external units are unable to access. In further preferred specific embodiments, memory unit 100 (FIG. 12) is assigned to device 300 but, if needed, situated externally of device 100, for example, in such a way that a data interface 306' (address bus and/or data bus and/or serial communication bus or the like) is accessible from the outside. In these specific embodiments, it is particularly advantageous if at least one test pattern PM or multiple test patterns or all test patterns available to device 300 are situated in integrated memory unit 304, in order to hamper a manipulation of test pattern PM. In this way, test patterns PM, which are stored, for example, in working memory 304a of integrated memory unit 304, may be efficiently accessed by computing device 302, in particular, for applying the method according to the specific embodiments to at least one memory area of memory unit 100.

In further preferred specific embodiments, instead of a complete test pattern PM, randomly or pseudo-randomly formed test pattern base data PMB (FIG. 12), which do not already represent a complete test pattern, may also be provided and transmitted to device 300 according to the specific embodiments and/or may be stored in at least one of memory units 100, 304 (preferably again in integrated memory unit 304). In further preferred specific embodiments, at least one test pattern PM may be formed by device 300, in particular, also dynamically (during the runtime of device 300), as a function of these test pattern base data PMB. In this case, one or multiple numerical values of computing device 302 or other operating variables of computing device 302 may be used to vary test pattern base data PBM in the desired manner in order to obtain a non-predictable test pattern. In further preferred specific embodiments, the formation of a test pattern as a function of test pattern base data PMB may, for example, advantageously save computing time resources of computing device 302 as compared to a complete (re-)formation of a complete test pattern PM.

In further preferred specific embodiments, device 300 is assigned a hardware security module device or cryptography module 307 or the like, which has a separate protected memory for storing at least one test pattern PMa. Only computing device 302, which is designed to carry out the method according to the specific embodiments, particularly preferably has access to test pattern PMa stored in hardware security module 307.

In further preferred specific embodiments, it is provided that hardware security module or cryptography module 307 at least partially or fully carries out the method according to the specific embodiments, for example, steps 200, 202, etc. In further preferred specific embodiments, it is provided that hardware security module or cryptography module 307 manages test pattern PMa (in particular, stores and/or forms) and/or ascertains test variable PG, and/or compares test variable PG with a reference test variable RPG. In further preferred specific embodiments, it is provided that hardware security module or cryptography module 307 is designed to output a result of the comparison of values PG, RPG to a further unit, for example, computing device 302.

Figure 3:
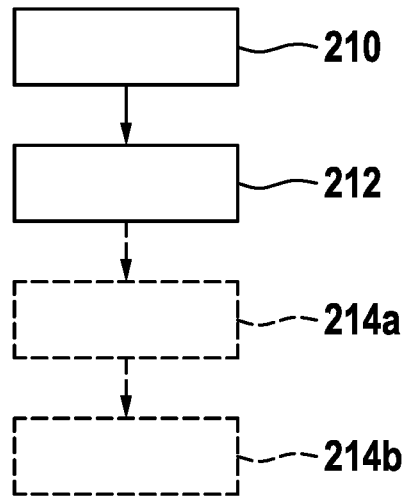
FIG. 3 schematically shows a simplified flowchart of a method according to further preferred specific embodiments of the present invention.
Figure 4A:
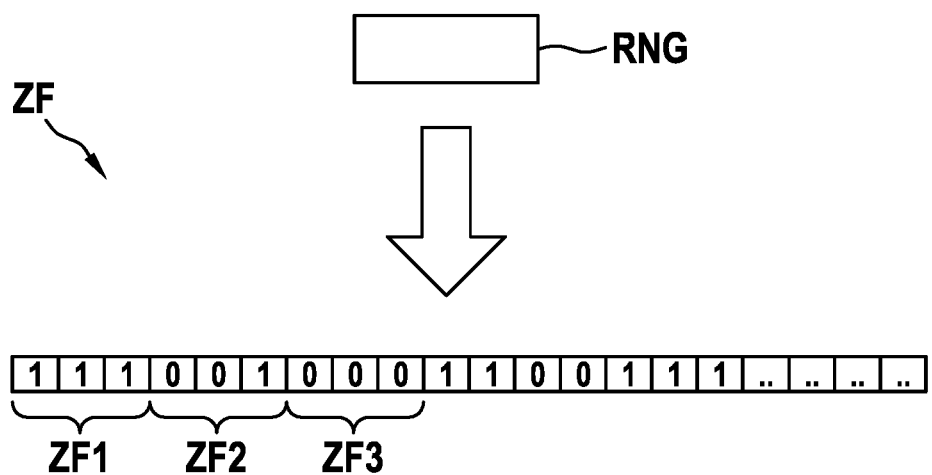
FIG. 4A schematically shows a sequence of numbers according to further preferred specific embodiments of the present invention.
Figure 4B:
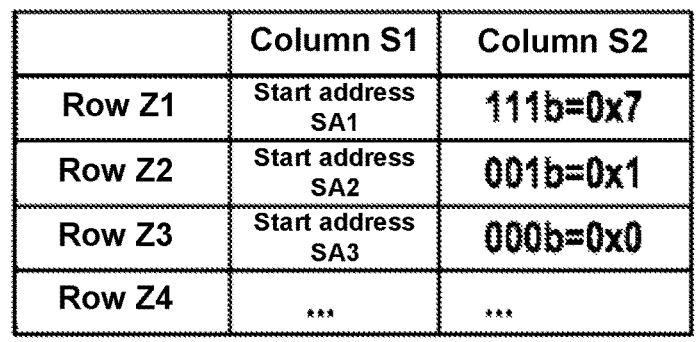
FIG. 4B schematically shows a table including data contents according to FIG. 4A of the present invention.

In further preferred specific embodiment, see the simplified flowchart according to FIG. 3, it is provided that the formation of test pattern PM (FIG. 12) encompasses the following steps: providing 210 (FIG. 3) a random or pseudo-random, preferably binary sequence of numbers ZF, see FIG. 4A, ascertaining 212 (FIG. 3) the at least one first subarea 110_1 (FIG. 1A) as a function of at least one first part ZF1 (FIG. 4A) of sequence of numbers ZF, in particular, a start address SA1 (FIG. 1A) of first subarea 110_1 in memory area 110 being formed as a function of first part ZF1 (FIG. 4A) of sequence of numbers ZF. In the present case, random sequence of numbers ZF is formed by a random generator RNG of device 300 (FIG. 12), and the first part ZF1 thereof is identified in FIG. 4A with reference sign ZF1 and in the present case includes, for example, three bits "111". For this purpose, table T1 according to FIG. 4B shows in a first column S1 by way of example, the identifiers of start addresses SA1, SA2, SA3, . . . of various subareas according to further preferred specific embodiments. For example, a test pattern is used in these specific embodiments, which characterizes a total of three subareas 110_1, 110_2, 110_3 of memory area 110a according to FIG. 1B, whose respective start address SA1, SA2, SA3 is identified in first column S1 of table T1.

Second column S2 of table T1 from FIG. 4B contains in rows Z1, Z2, Z3, . . . in each case a part of random sequence of numbers ZF according to FIG. 4A. For example, numerical value 0111b (binary) or 0x7 (hexadecimal) assigned to first part ZF1 of random sequence of numbers ZF, which specifies an offset (preferably measured in bytes) of first subarea 110_1 associated with first row Z1 from a reference address in memory area 110a (FIG. 1B), for example, from start address SA of memory area 110a or from an end address of an optionally preceding subarea, is assigned in the table cell that corresponds to first row Z1 and to second column S2 ("Z1; S2"). In the present case, first subarea 110_1, i.e., for example, 0111b (binary), is decimal seven, numerous bytes, away from start address SA of memory area 110a. An offset, in the present case related to end address EA1 of first subarea 110_1, of 0x1 i.e., 1 byte results for start address SA2 of second subarea 110_2 from row Z2 and column S2 of table T1. It should be noted that the representation according to FIG. 1B is not true to scale.

In further preferred specific embodiments, the length of all subareas 110_1, 110_2, 110_3, which are characterized by the test pattern, is constant, for example, permanently predefined or configurable (parameterized). Each end address EA1, EA2, EA3 of relevant subareas 110_1, 110_2, 110_3 may therefore be particularly efficiently ascertained by the addition of the constant length to each start address SA1, SA2, SA3.

In further preferred specific embodiments, start address SA1 of a subarea 110_1 considered may also be ascertained as a function of assigned part ZF1 of random sequence of numbers ZF in such a way that the value of the part of random sequence of numbers ZF1 is multiplied by a constant or configurable first factor F1. For example, first factor F1 in further preferred specific embodiments may be 32, F1=32. In this case, start address SA1 of first subarea 110_1 may be ascertained by multiplying the value of first part ZF1 to first factor F1, in the present case therefore SA1=7 (corresponding to 111b)*F1=7*32=224 (bytes), based on the value predefined by way of example of first part ZF1 of random sequence of numbers ZF. Thus, first subarea 110_1 in this specific embodiment starts at start address SA1=224 (i.e., for example, SA+224). It may correspondingly be ascertained for start address SA2 of second subarea 110_2: SA2=001b*32=32, this second start address SA2 specifying, for example, the distance of the start of second subarea 110_2 from end address EA1 of preceding first subarea 110_1. In the present case, value 000b results for start address SA3 of third subarea 110_3 from table T1 according to FIG. 4B, column S2, row Z3—also applying factor F1. This means that start address SA3 of third subarea 110_3 directly follows end address EA2 of preceding second subarea 110_2.

In further preferred specific embodiments, first factor F1 may also be pseudo-randomly or randomly selected, a lower limit and/or an upper limit for first factor F1 advantageously being predefined, however, in particular, as a function of the size of entire memory area 110a and/or as a function of the number of subareas on which the relevant test pattern is based. Alternatively, lower and upper limits may be provided in further preferred specific embodiments also for parts ZF1, 2, 3 of random sequence of numbers ZF. If, for example, a part of the sequence of numbers (for example, ZF1) exceeds or falls below the lower or upper limit, then this part of the sequence of numbers (for example, ZF1) is not incorporated into the test pattern formation and the following numeric portion (for example, ZF2) is used instead, etc.

In further preferred specific embodiments, the predefined number of subareas may be predefined for the formation of test pattern PM, as a result of which a further degree of freedom for controlling the formation of test pattern PM is advantageously provided.

In further preferred specific embodiments, an end address EA1 of, for example, first subarea 110_1 and/or a length of first subarea 110_1 may alternatively or additionally also be formed as a function of sequence of numbers ZF (FIG. 4A), in particular, as a function of parts of the sequence of numbers other than aforementioned first part ZF1.

Figure 5A:
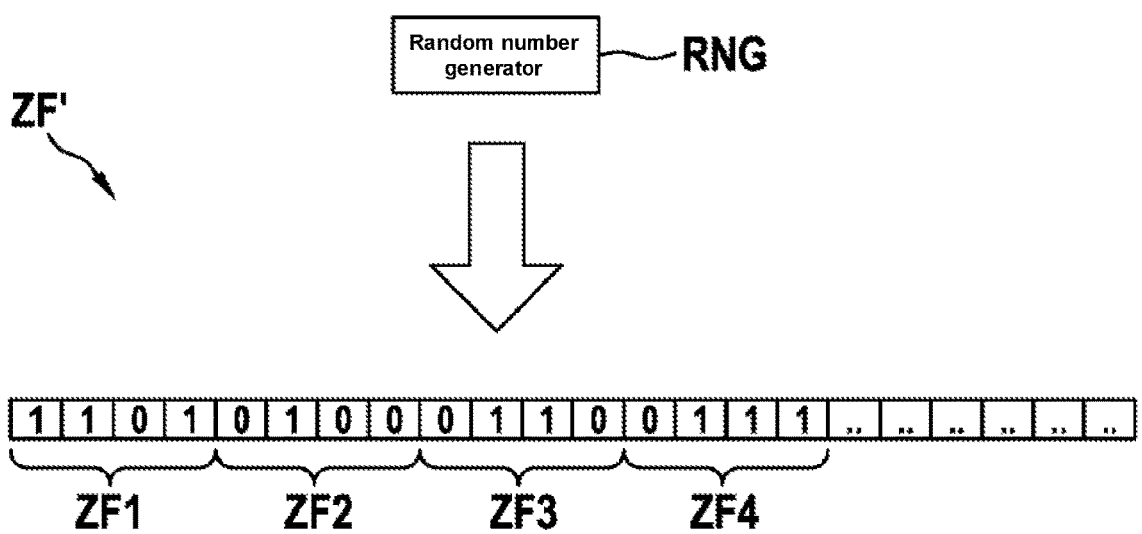
FIG. 5A schematically shows a sequence of numbers according to further preferred specific embodiments, FIG. 5B schematically shows a table including data contents according to FIG. 5A of the present invention.
Figures 5B, 6A:
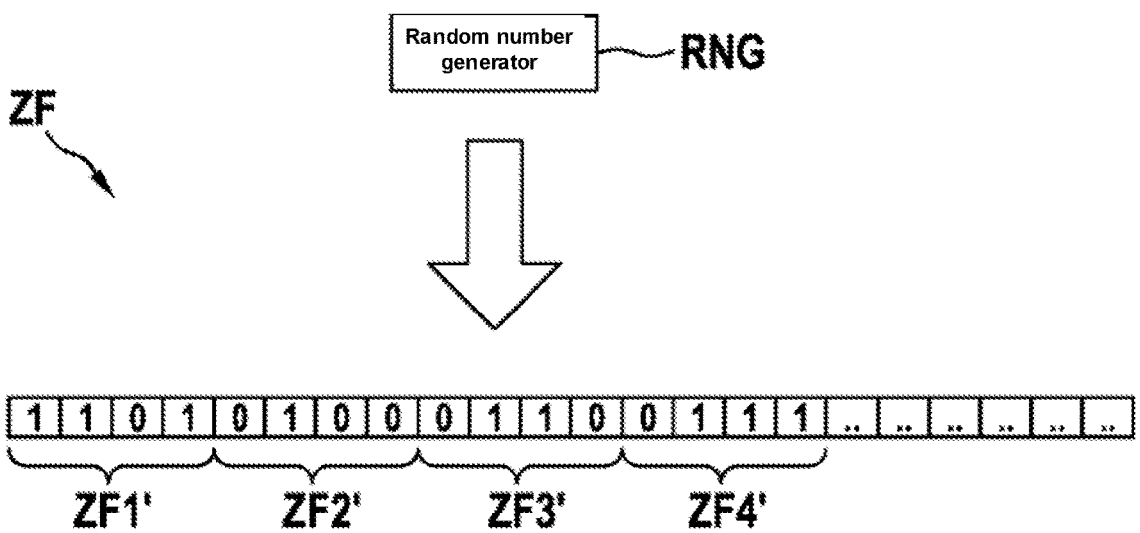
FIG. 6A schematically shows a sequence of numbers according to further preferred specific embodiments of the present invention.

In further preferred specific embodiments, see random sequence of numbers ZF' according to FIG. 5A and table T2 according to FIG. 5B, a start address SA1 of first subarea 110_1 may, for example, be ascertained as a function of first part ZF1 of sequence of numbers ZF', and a length L1 (FIG. 1B) of first subarea 110_1 may be ascertained as a function of a second part ZF2 of sequence of numbers ZF', which is different from first part ZF1 of sequence of numbers ZF'. If, in further preferred specific embodiments, further subareas 110_2, 110_3, . . . are provided in order to form the test pattern, the further subareas in further preferred specific embodiment may be ascertained in a comparable manner.

In table T2 according to FIG. 5B, first row Z1, for example, is assigned to a first memory area of a test pattern, second row Z2 to a second memory area, etc. A random value, which results from first part ZF1 of sequence of numbers ZF', is entered in column S2 row Z1 and characterizes in further preferred specific embodiments a size or length of first subarea 110_1. A further random value, which results from second part ZF2 of sequence of numbers ZF', is entered in column S3, line Z1 and characterizes in further preferred specific embodiments an offset of first subarea 110_1 to following second subarea 110_2, i.e., for example, a difference between start address SA2 of the second subarea and end address EA1 of the first subarea. A third random value, which results from third part ZF3 of sequence of numbers ZF', is entered in column S2, row Z2 and characterizes the length of second subarea 110_2. A fourth random value, which results from fourth part ZF4 of sequence of numbers ZF', is entered in column S3, row Z2 and characterizes the offset of the second subarea 110_2 to the following third subarea, etc.

In further preferred specific embodiments, the start address may be ascertained as a function of first part ZF1 of sequence of numbers ZF', and the end address, for example, of the first subarea and/or at least of one further subarea may be ascertained as a function of second part ZF2 of sequence of numbers ZF'.

In further preferred specific embodiments, the ascertainment of the start address and/or of the end address and/or of the length of at least one subarea as a function of a relevant part of the sequence of numbers may also encompass a multiplication of a numerical value represented by the relevant part of the sequence of numbers by a respective predefined factor (for example, similar to the above described first factor, whereby the respectively predefined factor in further preferred specific embodiments is able to be variously selected for the different parts of the sequence of numbers). The use of a corresponding factor makes it advantageously possible to ascertain from comparatively short parts ZF1, ZF2, . . . of sequence of numbers ZF, ZF' comparatively large memory areas or memory addresses and/or comparatively large offsets between the respective memory areas (provided, for example, the factor is multiplied by the parts of the random sequence of numbers that encode the offset). In further preferred specific embodiments, the respective factor may be (pseudo-)randomly ascertained or may be constantly or variably selected (for example, as a function of at least one operating parameter of device 300 (FIG. 12)).

In further preferred specific embodiments, start address SA1 of, for example, first subarea 110_1 may, for example also be interpreted as an offset of first subarea 110_1 from start address SA of memory area 110a (FIG. 1B) of the memory unit.

In further preferred specific embodiments, it is provided that in addition to first subarea 110_1, the test pattern characterizes at least one second subarea 110_2 (FIG. 1B), preferably multiple further subareas, second subarea 110_2, in particular, the at least one further subarea, not bordering directly on first subarea 110_1. This means that start address SA2 of the second or further subarea in the address space of the memory unit does not directly follow end address EA1 of first subarea 110_1 or of another, further (preceding subarea), thus resulting in a distribution of subareas 110_1, 110_2 contributing to the formation of test variable PG (FIG. 2A) over memory area 110a (FIG. 1B) of memory unit 100. As a result, comparatively large areas of memory unit 100 (FIG. 1) may advantageously be checked by means of the formation and evaluation of the test variable, without a data volume corresponding to entire memory area 110, 110a of memory unit 100 having to be considered for this purpose. Instead, it is sufficient to take into consideration the memory areas characterized by the at least one first subarea 110_1 or, if necessary, by further optional subareas 110_2, 110_3. This consideration is based on the fact that a targeted manipulation of such a memory area or of part of such a memory area, which is not covered by the subarea or subareas 110_1, 110_2, . . . according to the specific embodiments in terms of the formation of the test variable, is extraordinarily difficult or impossible due to the random or pseudo-random formation of test pattern PM, in particular, in such further preferred specific embodiments, in which test pattern PM is repeatedly, in particular, periodically reformed. Thus, in further preferred specific embodiments, it is sufficient if the at least one first subarea 110_1 or the optional further subarea 110_2, 110_3 does not cover the entire memory area 110, 110a of memory unit 100. Furthermore, the check of memory area 110, 110a is accelerated as a result as compared to such variants that take the entire data of the entire memory area for the formation of a test variable into consideration, because in the preferred specific embodiments fewer data than the entire data of the entire memory area are processed for the formation of the test variable.

In further preferred specific embodiments, it is provided that the method further includes, see the flowchart according to FIG. 3: a) ascertaining 214a second subarea 110_2 as a function of a second part ZF2 of sequence of numbers ZF, ZF' (FIG. 4A, 5A), which is different from first part ZF1 of sequence of numbers ZF, ZF', in particular, a start address SA2 of second subarea 110_2 being formed in memory area 110, 110a as a function of second part ZF2 of sequence of numbers ZF, ZF'. Further preferred specific embodiments for this purpose have already been described above with reference to FIGS. 4A, 4B, 5A, 5B.

In further preferred specific embodiments, it is provided that the method further includes, see the flowchart according to FIG. 3: ascertaining 214b further subareas 110_3, . . . as a function of a respective corresponding further part ZF3, ZF4 of sequence of numbers ZF', each of which is different, in particular, from first part ZF1 of sequence of numbers ZF' and/or from second part ZF2 of sequence of numbers ZF', in particular, a start address SA3 of respective further subarea 110_3 being formed in memory area 110a as a function of corresponding further part ZF3 of sequence of numbers ZF'. In further preferred specific embodiments, the aspects described above with reference to the ascertainment of first subarea 110_1 may also be applied accordingly to the second subarea and/or to at least one further memory area.

In further preferred specific embodiments, it is provided—as mentioned above with reference to FIG. 1B, that at least two, preferably all, subareas 110_1, 110_2, 110_3 have the same length L1. In further preferred specific embodiments, the start address or the end address of the relevant subarea in this case may, for example, be pseudo-randomly or randomly ascertained. In further preferred specific embodiments, it is also possible to (pseudo-)randomly ascertain constant length L1 and to then use it for the definition of the different subareas.

In further preferred specific embodiments, it is provided that at least some of the subareas have a different length. In this case, the length (and, if necessary, the start address and/or end address) of the relevant subarea, for example, may be pseudo-randomly or randomly ascertained in further preferred specific embodiments.

In further preferred specific embodiments, it is provided that length L1 (FIG. 1B) of at least one subarea 110_1 is ascertained as a function of at least one part of sequence of numbers ZF, ZF'.

Figure 6B:
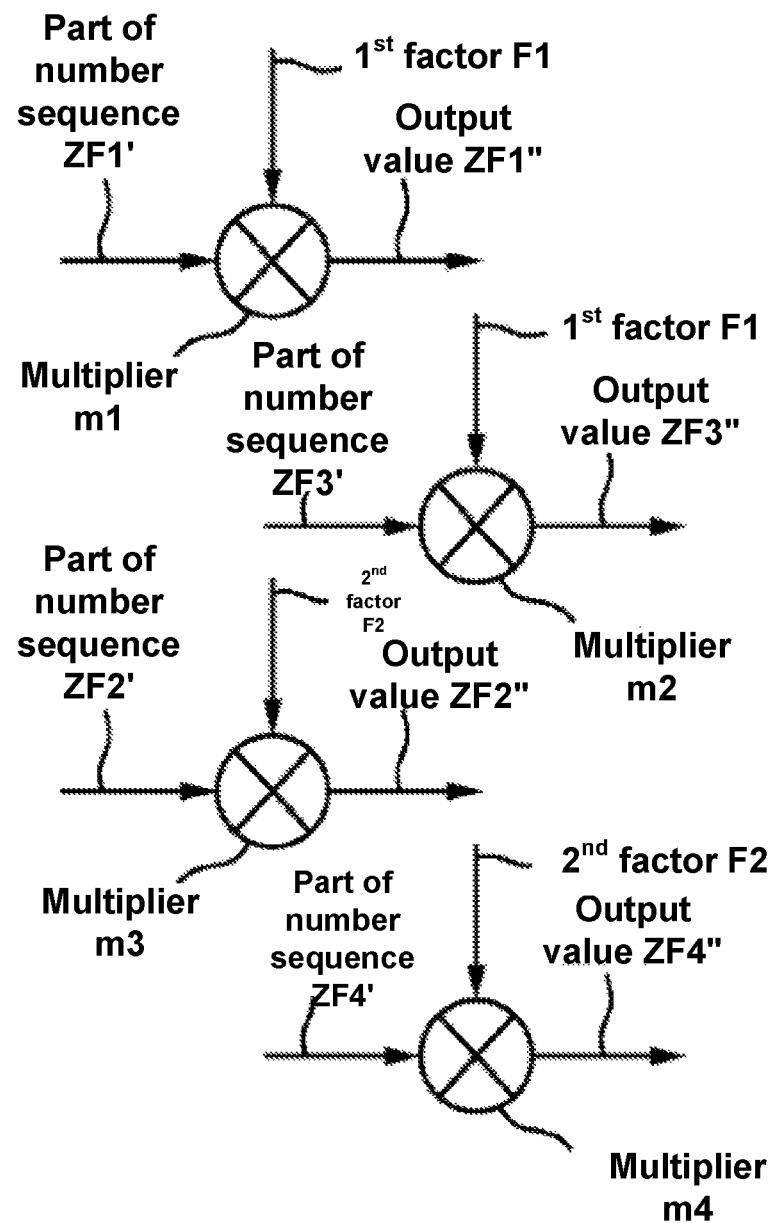
FIG. 6B schematically shows a multiplier arrangement according to further preferred specific embodiments of the present invention.
Figure 6C:
FIG. 6C schematically shows a table including data contents according to FIGS. 6A, 6B.

Further preferred specific embodiments are described below with reference to FIGS. 6A, 6B, 6C. FIG. 6A shows a random sequence of numbers ZF, which in the present case is divided, for example, into four different parts ZF1', ZF4', each of these parts, for example, encompassing a length of 4 bits. The corresponding binary values of different parts ZF1', ZF4' are transformed or scaled by the multiplier arrangement according to FIG. 6B with the aid of a first factor F1 and of a second factor F2 into different output value ranges. For example, a value assigned to first part ZF1' of random sequence of numbers ZF is multiplied by first factor F1 with the aid of a first multiplier m1, output value ZF1" being obtained as a product, which in the present case is also entered in column S2 and row Z1 of table T3 according to FIG. 6C. This output value ZF1" may be used in further preferred specific embodiments, for example, for establishing the size or length L1 of first subarea 110_1. A further output value ZF3", which is entered in column S2, row Z2 and is used, for example, for establishing the size or length of the second subarea, is ascertained in a comparative manner with the aid of a second multiplier m2 (FIG. 6B). Output values ZF2", ZF4" ascertained in column S3, row Z1, Z2 may be ascertained as is apparent from FIG. 6B with the aid of further multipliers m3, m4 as a function of further parts ZF2', ZF4' of random sequence of numbers ZF and of a second factor F2 and define, for example, an offset of the subareas corresponding to corresponding rows Z1, Z2 to an end of a subarea preceding in each case or of start address SA of memory area 110a (FIG. 1B).

In further preferred specific embodiments, second factor F2 may also be constant, for example, configurable or also (pseudo-) randomly formable.

FIG. 7A schematically shows a simplified diagram of a memory area 110b of a memory unit according to further preferred specific embodiments. Memory area 110b of the memory unit defined by start address SA and end address EA is subdivided in the present case into a multitude of different subareas 110_1, 110_2, 110_3a, 110_3b, 110_3c, 110_3d (identifies collectively multiple further subareas), 110_4a, 110_4b, 110_4c, 110_4d, 110_4e (identifies collectively multiple further subareas). Subareas 110_1, 110_2, 110_3a, 110_3b, 110_3c, 110_3d in this case form a test pattern PM (FIG. 12) according to the specific embodiments which, for example, has been formed on a (pseudo-)random basis according to the preceding specific embodiments described by way of example. Each of subareas 110_1, 110_2, 110_3a, 110_3b, 110_3c, 110_3d may, for example, be characterized in this case by one start address each and one end address each, which are not depicted for reasons of clarity. Further subareas 110_4a, 110_4b, 110_4c, 110_4d, 110_4e are not part of test pattern PM, and thus do not form the basis of the formation of test variable PG (see step 202 from FIG. 2A)

in further preferred specific embodiments. In the configuration shown by way of example in FIG. 7A, all subareas which together form the test pattern have, for example, the same length. From FIG. 7A, it is apparent that the test pattern characterized or formed by subareas 110_1, 110_2, 110_3a, 110_3b, 110_3c, 110_3d essentially uniformly covers entire memory area 110b, so that a reliable check of entire memory area 110b is possible with test variable PG according to the specific embodiments ascertained as a function of test pattern PM. Because test pattern PM contains random elements, an attacker is unable to know and unable to predict test pattern PM or parts thereof, i.e., in particular, the number and/or position and/or size of individual subareas, so that on this basis, the formation of test variable PG and thus, possibly, a manipulation involving a replication of the test variable while changing data of memory area 110b is extraordinarily difficult or impossible.

FIG. 7B schematically shows a simplified block diagram of a memory area 110c of a memory unit 100 according to further preferred specific embodiments. As is apparent from FIG. 7B, subareas 110_1, 110_2, 110_3a, 110_3b, 110_3c, 110_3d associated with test pattern PM have different lengths, which are ascertainable in further preferred specific embodiments, for example randomly, in particular, as a function of random sequence of numbers ZF, ZF'. Several of the subareas not covered in the present case by test pattern PM are identified symbolically in FIG. 7B with reference numerals 110_4a 110_4b.

The memory areas and their subareas depicted above with reference to FIG. 7A, 7B (not true to scale and highly schematized) as well as the allocation of the subareas to an affiliation for forming a test pattern are purely exemplary. In further preferred specific embodiments, other numbers of respective subareas and/or arrangements of the respective subareas within memory areas 110b, 110c and the like may also be undertaken.

Figure 8A:
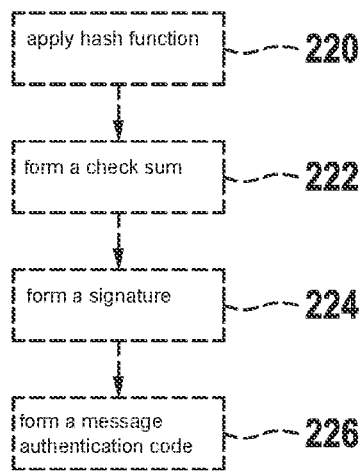
FIG. 8A schematically shows a simplified flowchart of a method according to further preferred specific embodiments of the present invention.

In further preferred specific embodiments, it is provided that the formation 202 (FIG. 2A) of test variable PG includes at least one of the following elements, see also the simplified flowchart according to FIG. 8A: a) applying 220 a hash function, in particular, a cryptographic hash function, in particular, to data D stored in the at least one first subarea 110_1 (FIG. 1A), b) forming 222 a check sum as a function of data D stored in the at least one first subarea 110_1, c) forming 224 a signature, in particular, as a function of a first secret (or private) key and of the data stored in the at least one first subarea 110_1 (and/or a hash value of the data stored in subarea 110_1 (from step 220 and 224)), d) forming 226 a message authentication code (MAC), in particular, CMAC (cipher-based MAC), in particular, as a function of a second secret (and symmetrical) key and of data D stored in the at least one first subarea 110_1.

In further specific embodiments, the application 220 of a hash function may encompass, for example, the application of a hash function of the type SHA-2, for example, SHA-224 and/or SHA-256 and/or SHA-384 and/or SHA-512 and/or other, preferably cryptologic (i.e., collision-resistant), hash functions. A particular high manipulation safety is provided in this way. Details regarding hash functions usable, for example, according to further preferred specific embodiments are specified at http://dx.doi.org/10.6028/NIST-.FIPS.180-4.

In further preferred specific embodiments, the formation 222 of the check sum may encompass, in particular, the formation of a CRC check sum and/or of a hash function or the like, the hash function, in particular, not necessarily being collision-resistant. As a result, a particularly efficient formation of test variable PG may take place, which in further preferred specific embodiments requires fewer computing resources than the application of cryptologic hash functions, at least in some implementations of device 300 or of a device that is designed to carry out the method according to the specific embodiments.

In further preferred specific embodiments, the selection of which of the aforementioned method or methods may be used for forming the test variable PG, may also be made dynamically, i.e., during the runtime of device 300. As a result, it is possible to flexibly exploit the available degree of freedom for forming test variable PG, for example, for adapting to predefinable boundary conditions such as computing time resources and/or memory of device 300 or safety requirements. In further preferred specific embodiments, it is further possible to temporarily use a first method for forming test variable PG, for example, a cryptographic hash function, for example, SHA-256, and to temporarily use by contrast a comparatively easily evaluatable CRC check sum for forming test variable PG. In this case it is advantageous according to further preferred specific embodiments if in each case corresponding reference test variables RPG (FIG. 2A) are present or may be ascertained for the various methods used for forming the test variable.

Figure 8B:
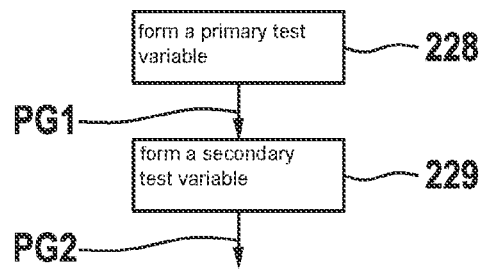
FIG. 8B schematically shows a simplified flowchart of a method according to further preferred specific embodiments of the present invention.
Figure 9:
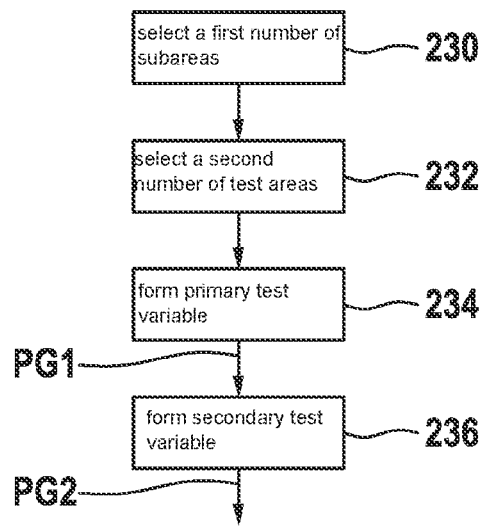
FIG. 9 schematically shows a simplified flowchart of a method according to further preferred specific embodiments of the present invention.

In further preferred specific embodiments, it is provided that the formation of test variable PG includes the following steps, cf. the simplified flowchart from FIG. 8B: forming 228 a primary test variable PG1 as a function of data D stored in the at least one first subarea 110_1 (FIG. 1A), preferably as a function of data stored in multiple subareas 110_1, 110_2 (FIG. 1B), forming 229 (FIG. 8B) a secondary test variable PG2 at least as a function of primary test variable PG1.

In further preferred specific embodiments, formation 228 of primary test variable PG1 encompasses, for example, the formation of a check sum, in particular, of a CRC check sum and/or the evaluation of a, preferably non-cryptographic hash function, for example, of an MD5 (Message Digest 5) hash function. As a result, it is possible to efficiently ascertain primary test variable PG1 with comparatively little resource expenditure, and to increase the manipulation safety, secondary test variable PG2 may be formed, for example using a cryptographic hash function, for example, SHA-256, this formation taking place preferably as a function of primary test variable PG1. In further preferred specific embodiments, secondary test variable PG2 may also be formed as a function of primary test variable PG1 as well as of at least one subarea 110_1 of memory area 110 associated with test pattern PM. As a result, in further preferred specific embodiments, an at least partially two-stage formation of the test variable, namely of second test variable PG2, is made possible, which in addition to primary test variable PG1 optionally also takes data, for example, of subarea 110_1 associated with test pattern PM directly into consideration. The generation of primary test variable PG1 in further preferred specific embodiments may also be interpreted as "data compression" and/or "data reduction" of the input data used for forming primary test variable PG1, since primary test variable PG1 even in further preferred specific embodiments may be significantly smaller than the input data taken into consideration for the ascertainment thereof. As a result, the data volume on which the formation of the secondary test variable is to be based may be advantageously reduced.

In further preferred specific embodiments, it is provided that the formation 202 (FIG. 2A) of test variable PG includes the following steps, see the simplified flowchart from FIG.

9: selecting 230 a first number of subareas of memory area 110 (FIG. 1A) of memory unit 100, selecting 232 a second number of subareas of memory area 110 of memory unit 100, which are, in particular, different from the first number, forming 234 a or the primary test variable PG1 for the first number of subareas of memory area 110, forming 236 a or the secondary test variable PG2 for the second number of subareas of the memory area, the formation 236 of second test variable PG2 optionally being carried out additionally for at least one part of primary test variable PG1. In this way, different test variables (for example, also with the aid of different methods) may be advantageously formed for the different subareas, as a result of which, for example, a computing time and/or a manipulation safety is flexibly, in particular, also dynamically (i.e., during the runtime of device 300) controllable. For example, it may be provided in further preferred specific embodiments to associate the first number of subareas with a first test variable PG1 ascertainable with comparatively little computing time, and to associate the second number of subareas with a second test variable PG2, which requires greater computing time (for example, SHA-256). With the aid of the selection of the first number and the second number or the ratio of the first number to the second number, it is advantageously possible to control the computing time and/or the manipulation safety of the entire method and, for example, in further preferred specific embodiments, to adapt an instantaneous operating state of device 300 or a utilized capacity of computing device 302. The data that are incorporated into the formation of first test variable PG1 and into the formation of second test variable PG2, are associated, for example, with test pattern PM.

Figure 10:
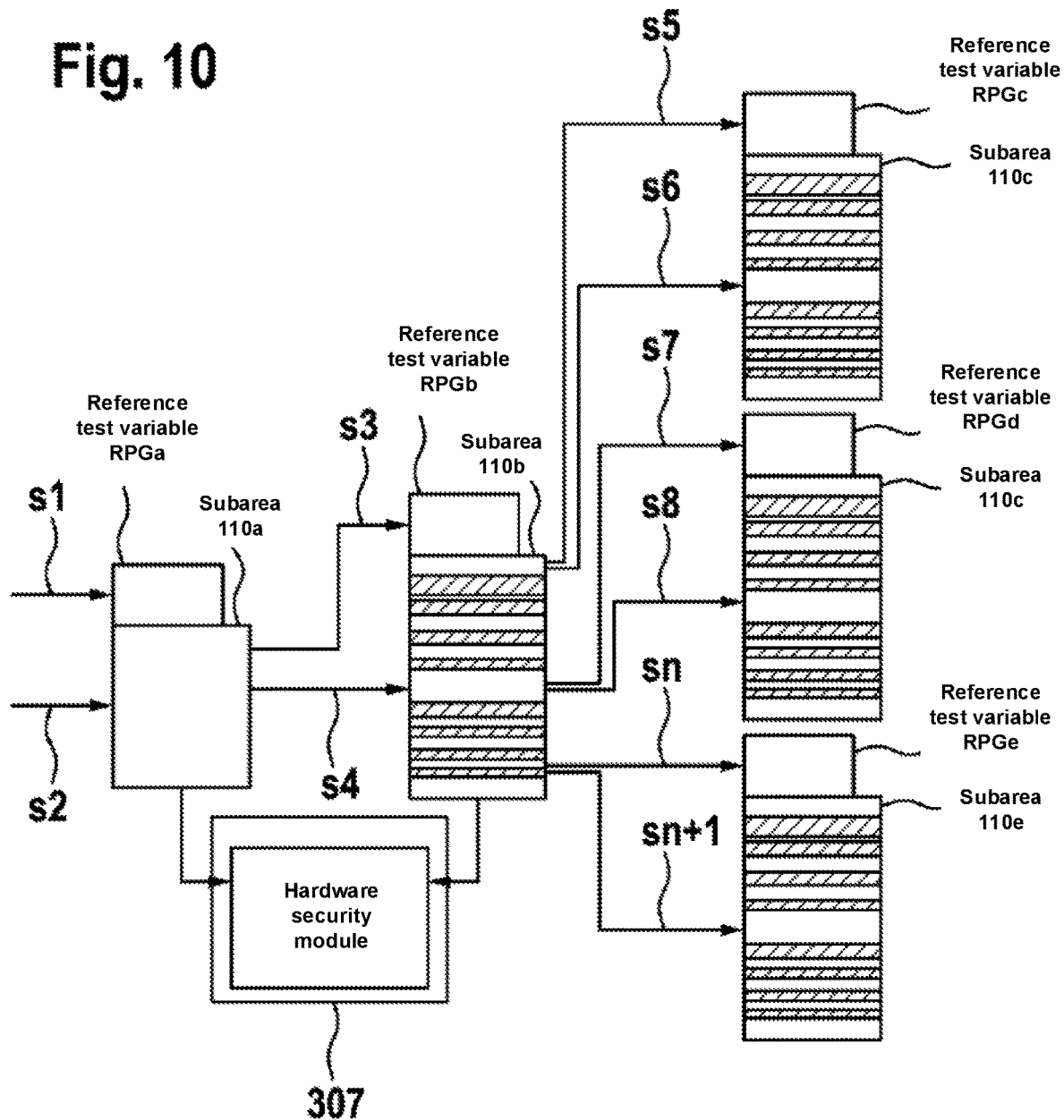
FIG. 10 schematically shows a simplified flowchart of a method according to further preferred specific embodiments of the present invention.

FIG. 10 schematically shows a simplified flowchart of a method according to further preferred specific embodiments. In the present case, a total of five memory areas 110a, 110b, 110c, 110d, 110e are considered by way of example, each of which forms, for example, a part of memory unit 100 (FIGS. 1A, 12). Each of the total of five memory areas 110a, 110b, 110c, 110d, 110e is assigned a unique reference test variable RPGa, RPGb, RPGc, RPGd, RPGe, which have been ascertained, for example, during a manufacture of memory unit 100 according to the specific embodiments described above and have been stored in a secured memory area, for example, of a hardware security module 307 (cf. also FIG. 12). In further preferred specific embodiments, the associated test patterns for ascertaining the respective reference test variables RPGa, RPGb, RPGc, RPGd, RPGe may be stored in hardware security module 307. In further preferred specific embodiments, the test pattern may, for example, also be formed (in particular, fully) or stored in hardware security module 307, and hardware security module 307 may be designed, for example, also for ascertaining the test variable(s).

First memory area 110a in the present case contains, for example, a bootloader, i.e., a computer program, which controls a start process of computing device 302 or of device 300 and establishes, for example, which further computer programs are executed after the start process. Second memory area 110b represents computer programs and/or data of an operating system for device 300 or for its computing device 302, and further memory areas 110c, 110d, 110e represent, for example, application programs for device 300.

At the beginning of the start process, an (instantaneous) test variable for memory area 110a, in which the bootloader is located, is initially ascertained in step s1 and then compared with reference test variable RPGa. In the case of a match, it may be deduced that the bootloader is intact, which is then started in step s2. The bootloader then forms in step s3 an instantaneous test variable for next memory area 110b, which contains the operating system, and compares the instantaneously formed test variable with corresponding reference test variable RPGb. In the case of a match between the instantaneously formed test variable and reference test variable RPGb for memory area 110b, it is deduced that the computer programs and/or data of the operating system are intact, i.e., not manipulated, and a corresponding computer program of the operating system is executed in step s4. A similar process subsequently takes place with the aid of steps s5, s6, s7, s8, sn, sn+1 in each case for further memory areas 110c, 110d, 110e, in each case using correspondingly assigned reference test variable RPGc, RPGd, RPGe.

In the exemplary embodiment described above with reference to FIG. 10, memory area 110a containing the bootloader has been preferably fully checked or checked using a test pattern that covers entire memory area 110a. In further preferred specific embodiments, memory area 110a containing the bootloader may also be checked with the aid of a test pattern that does not cover entire memory area 110a, as is the case here, for example, for further memory areas 110b, 110c, 110d, 110e.

FIG. 11A, 11B, 11C, each schematically shows (and not true to scale) a simplified flowchart of a method according to further preferred specific embodiments.

In the configuration depicted in FIG. 11A, a test pattern is provided, which characterizes a first number of multiple non-cohesive subareas 110_1, 110_2, ..., 110_9 of entire memory area 110f. The test pattern further characterizes a second number of further subareas which, for the sake of clarity, are provided collectively with reference numeral 111. In the present case, for example, four individual further subareas 111 are located between subareas 110_1, 110_2, three individual further subareas 111 in the present case between subareas 110_2, 110_3, etc. The areas of memory area 110f not identified in FIG. 11A are not detected by the test pattern. In the present case, eight functional blocks PG1_1, PG1_2, ... PG1_8 are provided, each of which forms one part of a primary test variable PG1 as a function of the data contents of memory areas 111 assigned to them. For example, functional block PG1_1 forms a first part of primary test variable PG1 as a function of four individual further subareas 111 between memory areas 110_1, 110_2, functional block PG1_2 forms a second part of primary test variable PG1 as a function of the three further subareas 111 between memory areas 110_2, 110_3, etc. Primary test variable PG1 may thus characterize as an 8-tuple of the output values each formed by functional blocks PG1_1, ..., PG1_8. In further preferred specific embodiments, it is provided that a secondary test variable PG2 is formed as a function both of primary test variable PG1 as well as a data content of the first number of subareas 110_1, 110_2, ..., 110_9, which is implementable in the present case, for example, with the aid of functional block PG2_1. Secondary test variable PG2 may, for example, be stored as reference test variable RPG (FIG. 2A) for a later use or may be used as instantaneous secondary test variable PG2, for example, for a comparison with a previously stored reference test variable RPG.

In further preferred specific embodiments, functional blocks PG1_1, ..., PG1_8 may, for example, be designed to form a CRC check sum via their input data, for example, a CRC check sum including 32 bits, which enables a particularly efficient ascertainment of primary test variable as 8-tuple of the CRC check sums obtained thereby. In further preferred specific embodiments, functional block PG2_1 is designed to apply a cryptographic hash function, for example, SHA-256, to input data ED fed to it, which results in second test variable PG2. In further preferred specific embodiments, input data ED may, for example, be formed as a concatenation of the output values of functional blocks PG1_1, . . . , PG1_8 and of the data of the first number of subareas 110_1, 110_2, . . . , 110_9.

In the configuration depicted in FIG. 11B, a test pattern is provided, similar to FIG. 11A, which characterizes a first number of multiple non-cohesive subareas 110_1, 110_2, . . . , 110_9 of entire memory area 110g. The test pattern further characterizes, in this regard likewise similar to FIG. 11A, a second number of further subareas which, for the sake of clarity, are provided collectively with reference numeral 111. As described above in connection with the specific embodiments according to FIG. 11A, the areas of memory area 110g not identified in FIG. 11B are not detected by the test pattern. In contrast to the configuration according to FIG. 11A, a single functional block PG1_1' is provided in the configuration according to FIG. 11B, to which the data of further subareas 111 are feedable as first input data ED1, for example, again as a concatenation, cf. element K, of the data of individual subareas 111. Functional block PG1_1' forms first test variable PG1 as a function of first input data ED1, for example, again using a CRC check sum or a comparatively less complex, in particular, non-cryptographic or non-collision-free hash function. First test variable PG1 is then combined with the data contents of the first number of subareas 110_1, 110_2, . . . , 110_9, for example, concatenated, which results in second input data ED2, which are transformed into second test variable PG2 by further block PG2_1, for example, using a further, preferably cryptographic hash function, for example, SHA-256.

In the configuration depicted in FIG. 11C, a test pattern is provided, similar to FIGS. 11A and 11B, which characterizes a first number of multiple non-cohesive subareas 110_1, 110_2, . . . , 110_9 of entire memory area 110h. The test pattern further characterizes, in this regard likewise similar to FIG. 11A, 11B, a second number of further subareas which, for the sake of clarity, are provided collectively with reference numeral 111. As described above in connection with the specific embodiments according to FIG. 11A, 11B, the areas of memory area 110h not identified in FIG. 11C are not detected by the test pattern. In contrast to the configuration according to FIG. 11A, 11B, each further subarea 111 in the configuration according to FIG. 11C is assigned a unique functional block for forming a primary test variable, for example, by means of the formation of a CRC check sum, of which however, only the three blocks PG1_1, PG1_2, and PG1_21 are identified for the sake of clarity. The output values of functional blocks PG1_1, PG1_2, . . . , PG1_21 are combined, preferably together with the data units of the first number of subareas 110_1, 110_2, . . . , 110_9, the combining preferably being able to encompass a concatenation, and the functional block PG2_1 applies a preferably cryptographic hash function, for example, SHA-512, to input data ED fed thereto.

Alternatively or in addition to the aforementioned check sums or hash function described by way of example above, message authentication codes (for example, MAC, CMAC) and/or signatures may also be used in further preferred specific embodiments in order to ascertain at least one of test variables PG, PG1, PG2.

Further preferred specific embodiments relate to a use of the method according to the specific embodiments before and/or after and/or during at least one of the following operating phases of a computing device 302 (FIG. 12), which is designed to access memory unit 100: a) starting computing device 302 from a switched-off state ("booting"), b) (re-)starting computing device 302 from an energy-saving state, in particular, from a suspend-to-RAM state, c) starting the computing device from a reset state, reset, in particular from a soft-reset, d) normal operation.

In this way, it is advantageously possible to check a memory content of memory unit 100 for proper content, for example, before starting ("booting") or before powering up from a suspend-to-RAM state or also during the normal operation, which may also be referred to as "runtime manipulation detection".

Further preferred specific embodiments relate to a device 300 (FIG. 12) for processing data stored in a memory unit, device 300 being designed to carry out the method according to the specific embodiments.

Further preferred specific embodiments relate to a method for forming a test pattern PM (FIG. 12), which characterizes at least a first subarea 110_1 (FIG. 1A) of a memory area 110 of, for example, a memory unit 100 for storing data D, test pattern PM being randomly or pseudo-randomly formed. In further preferred specific embodiments, it is provided that the method for forming test pattern PM is carried out by the above described device 300 according to the specific embodiments. In further preferred specific embodiments, however, the method for forming test pattern PM may (also) be carried out by other units 400, which then provide formed test pattern PM, for example, to device 300 according to the specific embodiments, preferably via a secure channel, for example, in a protected production environment in which device 300 according to the specific embodiments is manufactured.

In further preferred specific embodiments, the method according to the specific embodiments may, for example, be carried out by computing device 302. Alternatively or in addition, the method according to the specific embodiments may be carried out at least partially by an optional hardware security module 307, which in further preferred specific embodiments is integratable into device 300, in particular, may also be situated on a same semiconductor substrate as computing device 302 and/or further memory unit 304.

In further preferred specific embodiments, hardware security module 307 may include or provide a programmer interface (API), so that a computer program executed by computing device 302 for carrying out the method according to the specific embodiments is able with the aid of the programmer interface to call up corresponding functions of hardware security module 307, in order to execute at least some steps of the method according to the specific embodiments, for example, the evaluation of a hash function, with the aid of hardware security module 307. In further preferred specific embodiments, this is particularly advantageous when the ascertainment or formation of test variable PG is based on MAC or CMAC or signatures or generally in such cases in which a secret key or a shared secret or the like is to be used.

In further preferred specific embodiments, a computer program, which is designed to carry out the method according to the specific embodiments, may, for example, be stored in a read-only memory, for example, a ROM and/or an OTP (one-time programmable memory).

In further preferred specific embodiments, it is provided that for at least two different memory areas 110a, 110b, 110c, 110d, 110e (FIG. 10) different test patterns PM are provided in each case. This provides a further degree of freedom. For example, a comparatively thorough check using a correspondingly detailed and comprehensive test pattern PM may be provided for a memory area 110a including the bootloader, whereas for other memory areas 110c, 110d less comprehensive test patterns are provided which, for example, cover only a small area of the relevant memory area.

In further preferred specific embodiments, it is provided that a respective test pattern is selected for the relevant memory area as a function of computer programs and/or data stored in the different memory areas.

In further preferred specific embodiments, ascertainment 200, in particular, formation 200a, of at least one test pattern may advantageously take place dynamically, i.e., during the runtime of device 300, in further preferred specific embodiments also repeatedly, in particular, periodically. In further preferred specific embodiments, ascertainment 200, in particular, formation 200a, of at least one test pattern may take place on one or multiples of the following occasions: completion of the production of device 300, completion of a start process or of the booting of device 300, during an overrun, in particular, before device 300 is deactivated. The aforementioned specific embodiments apply accordingly also for the ascertainment of the at least one test variable as a function of the relevant test pattern.

In further preferred specific embodiments, it is provided that an ascertained or generated test pattern is used only once. Thereafter, at least one further test pattern may be ascertained, in particular, formed, if necessary. In further preferred specific embodiments, test variable PG or an assigned reference test variable may be used correspondingly also only once.

In further preferred specific embodiments, it is provided that a reference test variable RPG is written into a one-time programmable memory (OTP), from which device 300 is then able, when needed, to read the reference test variable. This may be advantageous, in particular, when device 300 does not have an optional hardware security module 307.

In further preferred specific embodiments, it may be provided to copy memory area 110 or the at least one first subarea 110_1 from memory unit 100 into a working memory 304a (FIG. 12) in order to carry out the method according to the specific embodiments with the copied data, for example, in order to form the test variable as a function of the copied data. In further preferred specific embodiments, the method according to the specific embodiments may also be applied directly to data located in memory unit 100, in particular, when memory unit 100 includes memory cells based on the NOR flash technology.

In further preferred specific embodiments, device 300 may be designed as a control unit, in particular, for a motor vehicle, for example, for an internal combustion engine of a motor vehicle. In further preferred specific embodiments, the application of the principle according to the specific embodiments is not limited, however, to the motor vehicle sector or to the field of control units.

In further preferred specific embodiments, the method according to the specific embodiments may also be combined with other methods for checking memory unit 100. For example, memory unit 100 may be checked at least temporarily according to the above described specific embodiments, for example, by ascertaining a test pattern, forming a reference test variable and, if necessary, later forming an instantaneous test variable using the same test pattern, comparing the instantaneous test variable with the reference test variable, and memory unit 100 may temporarily be checked also with other test methods, for example, such methods in which a test pattern is not formed on a (pseudo-)random basis.

One significant advantage of the principle according to the specific embodiments is the fact that the test pattern is not deterministic, thus, an attacker is unable to predict which areas of memory unit 100 are checked with the aid of the test pattern according to the specific embodiments. A further particular advantage is that individual devices 300 are each able to ascertain and/or to form and/or to utilize individual test patterns PM and/or test pattern base data PMB so that, for example, the relevant test patterns and/or the test pattern base data are known only within device 300, which further hampers manipulations. A further advantage of the principle according to the specific embodiments is the possibility of flexibly predefining a memory area to be checked, which is achievable, for example, by the dimensioning of test pattern PM. A "test density" is advantageously also dynamically adjustable, i.e., the proportion of the memory area covered by test pattern PM to the entire memory area of memory unit 100. In addition, in further preferred specific embodiments, waiting times between successive repetitions or renewed implementation of the method according to the specific embodiments are flexibly adjustable, which makes an exact adjustment of a temporal test density possible. In further preferred specific embodiments, different subareas 110_1, 110_2 of a memory unit may, for example, also be checked variously often or with variously sized test patterns.

Figure 13:
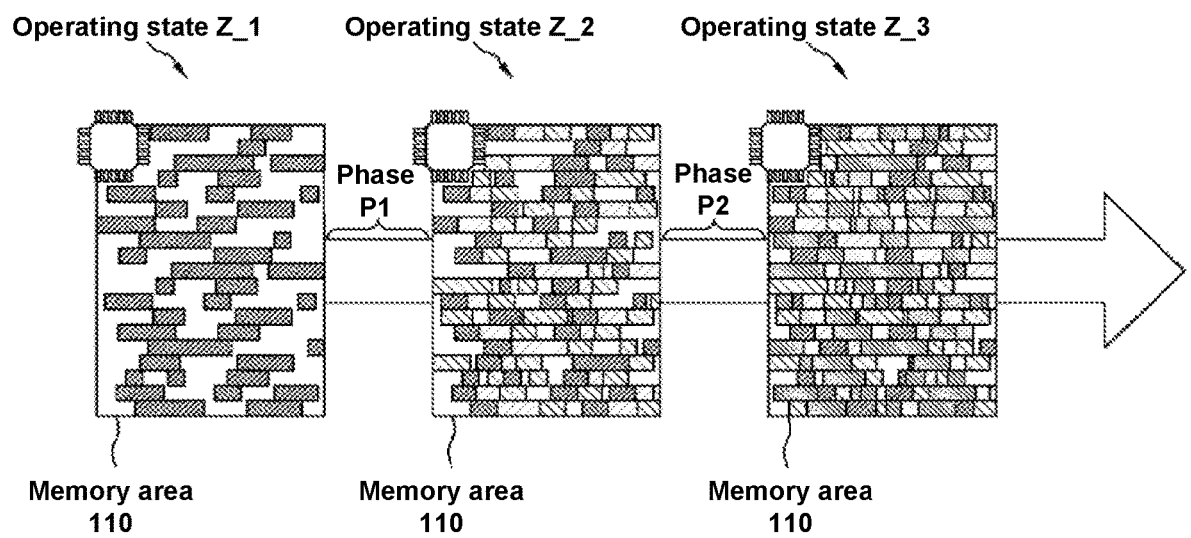
FIG. 13 schematically shows a simplified block diagram of a device according to further preferred specific embodiments of the present invention.

FIG. 13 schematically shows a simplified block diagram according to further preferred specific embodiments. A memory area 110 of memory unit 100 (FIG. 1A) is depicted, in three different operating states $Z\_1$, $Z\_2$, $Z\_3$. First operating state $Z\_1$ is characterized in that subareas indicated as rectangles not further identified in FIG. 13 have been checked with the aid of a first (pseudo-)randomly formed test pattern, for example, by comparing a first test variable obtained with the aid of the first test pattern with a corresponding, possibly previously formed reference test variable. A remaining unchecked area is cross-hatched.

Second operating state $Z\_2$ is characterized in that further subareas not further identified in FIG. 13 have been checked with the aid of a second (pseudo-)randomly formed test pattern, for example, by comparing a second test variable obtained with the aid of the second test pattern with a corresponding, possibly previously formed reference test variable. Third operating state $Z\_3$ is characterized in that further subareas not further identified in FIG. 13 have been checked with the aid of a third (pseudo-)randomly formed test pattern, for example, by comparing a third test variable obtained with the aid of the third test pattern with a corresponding, possibly previously formed reference test variable. Between first operating state $Z\_1$ and second operating state $Z\_2$, cf. phase P1, a or the device 300 accessing memory unit 100 may, for example, be inactive, for example, by deactivation or by adopting a suspend-to-RAM state or another energy-saving state. Between second operating state $Z\_2$ and third operating state $Z\_3$, cf. phase P2, device 300 accessing memory unit 100 may, for example, be inactive once again, for example, by deactivation or by adopting a suspend-to-RAM state or another energy-saving state.

After the end of phase P1, device 300 is reactivated and then carries out a check with the aid of the second test pattern which, due to its non-deterministic character, effectuates the at least partial check of the memory areas previously not already checked with the aid of the first test pattern. The same is applicable for the further check after the end of phase P2. In this way, it is possible in further preferred specific embodiments to advantageously successively check virtually entire memory area 110 of memory unit 100. At the same time, the need for resources, in particular, also processing time, is flexibly controllable, in particular, in such a way that even larger memory areas are efficiently checkable without adversely affecting an operation of the device.

In further preferred specific embodiment, the second test pattern for the check may be ascertained during second operating state Z_2, for example, by device 300, before it is deactivated or powers down at the end of first operating state Z_1. After the formation, the second test pattern is securely stored, preferably within device 300, and a test variable, which is usable as the reference test variable for the check during second operating state Z-2 and is also stored in device 300, is ascertained with the aid of the second test pattern. Device 300 then enters into phase P1 of the inactivity, which it leaves again to adopt second operating state Z_2. The second check may then take place, for example, with the aid of a bootloader, using the previously formed second test pattern and the corresponding reference test variable, in particular, before a normal operation during second operating state Z_2 (execution of application programs and the like) is assumed. The second check may, for example, encompass the formation of an instantaneous test variable using the second test pattern and the comparison of the instantaneous test variable obtained in this manner with the reference test variable. If a match between the instantaneous test variable and the reference test variable is established, it may be deduced that no manipulation of the memory unit has taken place, the data are therefore authentic and integer. Otherwise, an error response may, for example, be initiated. A comparable process may take place for a state transition from second operating state Z_2 to third operating state Z_3. Since the test pattern in the individual operating states continuously changes in a non-deterministic manner, an attacker is unable to predict the test pattern and, therefore, the bases of the formation of the test variable, so that unidentified manipulations of the data stored in memory 100 are virtually impossible.

In further preferred specific embodiments, the method according to the specific embodiments may be carried out partially by a or the computing device 302 and/or a potentially existing hardware security module 307. For example, in further preferred specific embodiments, at least some of the following steps are carried out by computing device 302 and/or optionally existing hardware security module 307: storing the first or second secret key with respect to a hash value of the first or second secret key, processing the first or second secret key, forming and/or storing test pattern PM or the test pattern base data, forming and/or storing the reference test variable based on the test pattern or on the test pattern base data, forming and/or storing the instantaneous test variable based on the test pattern or on the test pattern base data, comparing the instantaneous test variable with the reference test variable or verifying the instantaneous test variable.

In further preferred specific embodiments, test pattern PM or test pattern base data PMB and/or reference test variable RPG is/are not necessarily stored in an internal memory, for example, of computing device 302, alternatively or in addition, test pattern PM or test pattern base data PMB in further preferred specific embodiments may also be stored, for example, in encrypted form, in an external memory unit and/or possibly a key or a hash value of this key used for the encryption may be stored in a or in the internal memory. Furthermore, this key may be carried out in further preferred specific embodiments preferably in a device-/control unit (in general: device) specific manner.

In further preferred specific embodiments, reference test variable RPG may be stored in particular, in non-encrypted form, in an internal or external memory unit, in particular, if: reference test variable RPG represents an asymmetrical signature, and/or the reference test variable represents a MAC.

In further preferred specific embodiments, reference test variable RPG may be stored, in particular, in encrypted form, in an external memory unit, in particular, if reference test variable RPG represents a cryptographic hash (value), in particular, the same or comparable criterion being usable for the key used for the encryption as for the encryption of test pattern PM (see description above).

What is claimed is:

1. A method for processing data stored in a memory area of an electronic storage, the method comprising the following steps:
    obtaining a test pattern that is generated randomly or pseudo-randomly and that includes a respective value for each of one or more storage parameters, the respective value for the each of the one or more storage parameters in combination identifying a location of at least one first subarea within the memory area of the electronic storage;
    as a function of the location identified by the test pattern, obtaining data stored in the at least one first subarea of the memory area of the electronic storage; and
    forming a test variable using the data obtained from the at least one first subarea of the memory area of the electronic storage.

2. The method as recited in claim 1, further comprising:
    a) storing at least temporarily the test variable; and/or
    b) comparing the test variable with a reference test variable for the at least one first subarea.

3. The method as recited in claim 1, wherein the obtaining of the test pattern includes at least one of the following:
    (a) generating the test pattern randomly or pseudo-randomly;
    (b) receiving the test pattern from an external unit;
    (c) reading out the test pattern from the memory unit electronic storage and/or from a further electronic storage; and
    (d) deriving the test pattern from a test pattern base data.

4. The method as recited in claim 1, wherein:
    the test pattern includes a random or pseudo-random sequence of numbers; and
    the one or more storage parameters includes a start address parameter whose value identifies a start address of the at least one first subarea, which is ascertainable from at least one first part of the sequence of numbers.

5. The method as recited in claim 4, wherein:
    the respective value for the each of one of more storage parameters of the test pattern further identifies a location of at least one second subarea within the memory area, the at least one second subarea not directly bordering the first subarea within the memory area; and
    the one or more storage parameters includes another start address parameter whose value identifies a start address of the at least one second subarea, which is ascertainable from a second part of the sequence of numbers.

6. The method as recited in claim 4, wherein:
the respective value for the each of one of more storage parameters of the test pattern further identifies a location of multiple further subareas withing the memory area; and
the one or more storage parameters includes a plurality of other start address parameters whose respective values identify respective start addresses of the further subareas, which are ascertainable from respective further parts of the sequence of numbers.

7. The method as recited in 6, wherein all of the first subarea and the multiple further subareas of the memory area have the same length as one another.

8. The method as recited in 6, wherein two or more of the first subarea and the multiple further subareas of the memory area have different lengths than one another.

9. The method as recited in claim 4, wherein the one or more storage parameters includes a length parameter whose value identifies a length of the first subarea, which is ascertainable from at least one other part of the sequence of numbers.

10. The method as recited in claim 1, wherein the respective value for the each of one of more storage parameters of the test pattern further identifies a location of at least one second subarea within the memory area, the at least one second subarea not directly bordering the first subarea within the memory area.

11. The method as recited in claim 1, wherein the respective value for the each of one of more storage parameters of the test pattern further identifies respective locations of multiple further subareas within the memory area.

12. The method as recited in claim 1, wherein the test pattern does not identify a location of an entirety of the memory area.

13. The method as recited in claim 1, wherein the forming of the test variable includes at least one of the following:
 a) applying a cryptographic hash function to the obtained data;
 b) forming a checksum as a function of the obtained data;
 c) forming a signature as a function of a first secret key and of the obtained data; and
 d) forming a message authentication code as a function of a second secret key and of the obtained data.

14. The method as recited in claim 1, wherein the forming of the test variable includes: forming a primary test variable as a function of the obtained data and forming a secondary test variable at least as a function of the primary test variable.

15. The method as recited in claim 1, wherein the forming of the test variable includes the following steps:
 selecting the at least one first subarea, the at least one first subarea including a first number of subareas of the memory area of the electronic storage;
 selecting a second subarea, the second subarea including a second number of subareas of the memory area of the electronic storage which are different from the first number of subareas;
 forming a primary test variable based on the first number of subareas of the memory area; and
 forming a secondary test variable based on the second number of subareas of the memory area.

16. The method as recited in claim 15, wherein the formation of the secondary test value carried out additionally based on at least one part of the primary test variable.

17. The method as recited in claim 1, wherein:
the steps of the method are carried out before and/or after and/or during at least one operating phase of a device that includes at least one processor, the at least one processor being is configured to access the electronic storage; and
the at least one operating phase includes at least one of:
 a) a starting of the device from a switched-off state;
 b) a starting of the device from a suspend-to-RAM energy-saving state;
 c) a starting of the device from a reset state; and
 d) a runtime operation of the device.

18. A device for processing data stored in a memory area of an electronic storage, the device comprising:
at least one processor, wherein the at least one processor, in combination, is configured to:
 obtain a test pattern that is generated randomly or pseudo-randomly and that includes a respective value for each of one or more storage parameters, the respective value for the each of the one or more storage parameters in combination identifying a location of at least one first subarea within the memory area of the electronic storage;
 as a function of the location identified by the test pattern, obtain data stored in the at least one first subarea of the memory area of the electronic storage; and
 form a test variable using the data obtained from the at least one first subarea of the memory area of the electronic storage.

19. The device as recited in claim 18, wherein the at least one processor, in combination, is further configured to:
 a) store at least temporarily the test variable; and/or
 b) compare the test variable with a reference test variable for the at least one first subarea.

20. A method comprising:
forming a test pattern composed of at least one value by randomly or pseudo-randomly generating, for each of one or more storage parameters, a respective value of the at least one value, wherein the at least one value of the test pattern identifies a location of a subarea of a memory area of an electronic storage of at least one electronic storage;
based on the formed test pattern:
 obtaining, at a first point in time, data stored, at the first point in time, in the location identified by the test pattern;
 generating a reference test variable using the data obtained at the first point in time; and
 storing, in the electronic storage or in a different one of the at least one electronic storage (a) the test pattern or an identification of the test pattern and (b) the reference test variable;
based on the stored test pattern or the identification of the test pattern, obtaining, at a second point in time, data stored, at the second point in time, in the location identified by the test pattern;
generating a current test variable using the data obtained at the second point in time; and
determining whether an electronic data manipulation has occurred by comparing the current test variable to the reference test variable.

* * * * *